US010868707B1

(12) United States Patent
Friedman et al.

(10) Patent No.: US 10,868,707 B1
(45) Date of Patent: Dec. 15, 2020

(54) ZERO-LATENCY MESSAGE PROCESSING WITH VALIDITY CHECKS

(71) Applicant: Liquid-Markets-Holdings, Incorporated, Lutherville, MD (US)

(72) Inventors: Seth Gregory Friedman, Tokyo (JP); Alexis Nicolas Jean Gryta, Tokyo (JP); Thierry Gibralta, Tokyo (JP)

(73) Assignee: Liquid-Markets-Holdings, Incorporated, Lutherville, MD (US)

( * ) Notice: Subject to any disclaimer, the term of this patent is extended or adjusted under 35 U.S.C. 154(b) by 0 days.

(21) Appl. No.: 16/889,226

(22) Filed: Jun. 1, 2020

Related U.S. Application Data

(60) Provisional application No. 62/900,878, filed on Sep. 16, 2019.

(51) Int. Cl.
*H04L 29/06* (2006.01)
*H04L 12/861* (2013.01)
*H04L 12/46* (2006.01)

(52) U.S. Cl.
CPC ...... *H04L 29/0653* (2013.01); *H04L 12/4645* (2013.01); *H04L 29/06095* (2013.01);
(Continued)

(58) Field of Classification Search
CPC ............ H04L 29/0653; H04L 12/4645; H04L 29/06095; H04L 29/06523; H04L 49/9057;
(Continued)

(56) References Cited

U.S. PATENT DOCUMENTS

| 5,926,473 A | 7/1999 | Gridley |
| 6,327,242 B1 | 12/2001 | Amicangioli et al. |

(Continued)

FOREIGN PATENT DOCUMENTS

| KR | 10-2013-0126833 | 11/2013 |
| WO | 2005/107142 | 11/2005 |

OTHER PUBLICATIONS

Agarwal et al., "Faster FAST: Multicore Acceleration of Streaming Financial Data," Computer Science Research and Development, May 2009, 11 pages, vol. 23.
(Continued)

*Primary Examiner* — Shukri Taha
(74) *Attorney, Agent, or Firm* — McDonnell Boehnen Hulbert & Berghoff LLP

(57) ABSTRACT

An example embodiment may involve a network interface configured to transmit and receive frames. The embodiment may also involve a network protocol stack configured to: (i) perform encapsulation of outgoing messages into outgoing frames for transmission by way of the network interface, or (ii) perform decapsulation of incoming frames received by way of the network interface into incoming messages. The embodiment may also involve a parsing and validation module configured to: (i) receive representations of the incoming or the outgoing messages, and (ii) perform one or more validation checks on the representations, wherein the representations define transactions that are functionally equivalent to corresponding transactions that are defined by the messages, wherein the one or more validation checks are performed in parallel to performance of the encapsulation or decapsulation, and wherein a representation of a message failing the one or more validation checks causes the message to be discarded.

20 Claims, 19 Drawing Sheets

(52) U.S. Cl.
CPC .... *H04L 29/06523* (2013.01); *H04L 49/9057* (2013.01); *H04L 2212/00* (2013.01)

(58) Field of Classification Search
CPC .... H04L 12/4633; H04L 69/16; H04W 48/16; G06F 21/606
See application file for complete search history.

(56) References Cited

U.S. PATENT DOCUMENTS

| | | | |
|---|---|---|---|
| 6,522,656 | B1 | 2/2003 | Gridley |
| 6,535,509 | B2 | 3/2003 | Amicangioli et al. |
| 6,963,575 | B1 | 11/2005 | Sistanizadeh et al. |
| 7,224,669 | B2 | 5/2007 | Kagan et al. |
| 7,230,947 | B1 | 6/2007 | Huber et al. |
| 7,500,004 | B1 | 3/2009 | Homer |
| 7,636,703 | B2 | 12/2009 | Taylor |
| 7,640,208 | B2 | 12/2009 | Grossman |
| 7,640,298 | B2 | 12/2009 | Berg |
| 7,680,718 | B2 | 3/2010 | Brandes et al. |
| 7,707,098 | B2 | 4/2010 | West et al. |
| 7,827,087 | B2 | 11/2010 | Adatia et al. |
| 7,840,481 | B2 | 11/2010 | Aloe et al. |
| 7,873,560 | B2 | 1/2011 | Reich et al. |
| 7,921,046 | B2 | 4/2011 | Parsons et al. |
| 8,014,274 | B1 | 9/2011 | Amicangioli et al. |
| 8,296,221 | B1 | 10/2012 | Waelbroeck et al. |
| 8,751,364 | B2 | 6/2014 | Gaber et al. |
| 9,432,298 | B1* | 8/2016 | Smith ................. H04L 49/9057 |
| 9,501,795 | B1 | 11/2016 | Friedman |
| 2002/0056039 | A1 | 5/2002 | Lim et al. |
| 2002/0156721 | A1 | 10/2002 | Lyback et al. |
| 2004/0117438 | A1 | 6/2004 | Considine et al. |
| 2004/0236888 | A1 | 11/2004 | Dieffenderier et al. |
| 2005/0122966 | A1 | 6/2005 | Bowes |
| 2005/0232161 | A1 | 10/2005 | Maufer et al. |
| 2007/0291753 | A1 | 12/2007 | Romano |
| 2008/0013547 | A1 | 1/2008 | Klessig et al. |
| 2008/0243675 | A1 | 10/2008 | Parsons et al. |
| 2009/0157452 | A1 | 6/2009 | Arora et al. |
| 2010/0082474 | A1 | 4/2010 | Beaumont |
| 2010/0094743 | A1 | 4/2010 | Robertson et al. |
| 2010/0095277 | A1 | 4/2010 | Cheng et al. |
| 2010/0174770 | A1 | 7/2010 | Pandya |
| 2011/0016221 | A1 | 1/2011 | Amicangioli et al. |
| 2012/0130919 | A1 | 5/2012 | Gaber |
| 2012/0166327 | A1 | 6/2012 | Amicangioli |
| 2013/0091349 | A1* | 4/2013 | Chopra ................. H04L 12/462 713/150 |
| 2013/0107892 | A1 | 5/2013 | Rubin et al. |
| 2013/0117621 | A1 | 5/2013 | Saraiya et al. |
| 2015/0019748 | A1* | 1/2015 | Gross, IV ............. H04L 47/825 709/230 |
| 2015/0095207 | A1 | 4/2015 | Kodde |
| 2015/0095613 | A1 | 4/2015 | Kodde |
| 2015/0124831 | A1 | 5/2015 | Kumar et al. |
| 2016/0261430 | A1 | 9/2016 | Lepp et al. |
| 2016/0262182 | A1 | 9/2016 | Yang |
| 2016/0337086 | A1 | 11/2016 | Shen |
| 2017/0294991 | A1 | 10/2017 | Vincent et al. |
| 2018/0183901 | A1 | 6/2018 | Lariviere et al. |
| 2018/0309595 | A1 | 10/2018 | Ma |
| 2018/0338265 | A1 | 11/2018 | Goel |
| 2019/0109822 | A1* | 4/2019 | Clark ................. H04L 63/0428 |
| 2019/0188738 | A1 | 6/2019 | Kodde |
| 2019/0268445 | A1* | 8/2019 | Zhang ..................... H04L 69/16 |
| 2019/0363857 | A1 | 11/2019 | Hwang |
| 2020/0314009 | A1 | 10/2020 | Goswami |

OTHER PUBLICATIONS

Declaration of Inventor Under 37 CFR 1.132—Seth Gregory Friedman, filed Jan. 13, 2014 in U.S. Appl. No. 13/633,465, 526 pages (submitted as parts 1 and 2).

Final Office Action dated Nov. 13, 2013, issued in connection with U.S. Appl. No. 13/216,161, 15 pages.

GE Fanuc Intelligent Platforms, "WANic 5860 Packet Processors: Intelligent High-Performance 4-Port Gigabit Ethernet Packet Processor PCI-X Card," Copyright 2008, 2 pages.

Leber et al., "High Frequency Trading Acceleration Using FPGAs," 2011 International Conference on Field Programmable Logic and Applications (FPL), Sep. 2011, 6 pagese.

Lockwood et al., "NetFPGA—an Open Platform for Gigabit-rate Network Switching and Routing," IEEE Internationa Conference on Microelectronic Systems Education, Jun. 2007, 2 pages.

Moallemi et al., "The Cost of Latency," Jul. 19, 2011, 49 pages.

Morris et al., "FPGA Accelerated Low-Latency Market Data Feed Processing," 17th IEEE Symposium on High Performance Interconnects, 2009, 7 pages.

Nomura Holdings, Inc., "Nomura Launches Ultra-Low Latency NXT Product Suite in the US," News Release, [online], Nov. 9, 2010. Retrieved from the Internet at <URL: http://www.nomuraholdings.com/news/nr/americas/20101109/20101109.html>, 2 pages.

Non-Final Office Action dated Feb. 6, 2013, issued in connection with U.S. Appl. No. 13/216,161, 9 pages.

Response to Non-Final Office Action filed on Aug. 2, 2013, in connection with U.S. Appl. No. 13/216,161, 11 pages.

Response to Restriction Requirement and Preliminary Amendment filed Oct. 23, 2012, in connection with U.S. Appl. No. 13/216,161, 11 pages.

Restriction Requirement dated Aug. 23, 2013, issued in connection with U.S. Appl. No. 13/216,161, 6 pages.

Sadoghi et al., "Efficient Event Processing Through Reconfigurable Hardware for Algorithmic Trading," Proceedings of the VLDB Endowment, 2010, 4 pages, vol. 3, No. 2.

The Tabb Group, LLC, "The Value of a Millisecond: Finding the Optimal Speed of a Trading Infrastructure," Copyright 2008, 17 pages.

Cut-Through and Store-and-Forward Ethernet Switching for Low-Latency Environments, Cisco Systems, Inc., 2008.

Kermani and Kleinrock, Virtual Cut-Through: A New Computer Communication Switching Technique, North-Holland Publishing Company. Computer Networks 3, 1979, pp. 267-286.

Haas, The IEEE 1355 Standard: Developments, Performance and Application in High Energy Physics, Doctoral Thesis, University of Liverpool, Dec. 1998.

Trimberger and Moore, FPGA Security:Motivations, Features, and Applications, Proceedings of the IEEE, vol. 102, No. 8, Aug. 2014.

U.S. Appl. No. 16/864,447, Transaction Encoding and Verification by Way of Data-Link Layer Fields, filed May 1, 2020.

Final Office Action dated Oct. 21, 2020, issued in connection with U.S. Appl. No. 16/864,447, filed May 1, 2020, 21 pages.

Non-Final Office Action dated Jul. 30, 2020, issued in connection with U.S. Appl. No. 16/864,447, filed May 1, 2020, 12 pages.

International Search Report and Written Opinion dated Aug. 20, 2020, issued in corresponding International Application No. PCT/US2020/031270, filed May 4, 2020, 16 pages.

International Search Report and Written Opinion dated Sep. 17, 2020, issued in corresponding International Application No. PCT/US2020/035683, filed Jun. 2, 2020, 13 pages.

* cited by examiner

| ID | Source | Name | Description |
|---|---|---|---|
| Network Message Data | | | |
| D001 | M | SeqNum | Extract: Network Protocol Message Sequence Number |
| D002 | M | MsgType | Extract: Network Protocol Message Type |
| D003 | B | MsgState | Retrieve: Current State Valid Network Message State(s) |
| D004 | B | MessageHistoryBuffer | Retrieve: Same Message Buffer |
| D005 | B | AuthorizedConnectionList | Retrieve: Allowed Source IP/Port to Destination IP/Port Mapping |
| Application Message Data | | | |
| D006 | M | SeqNum | Extract: Application Protocol Message Sequence Number |
| D007 | M | MsgType | Extract: Application Protocol Message Type |
| D008 | B | MsgState | Retrieve: Current State Valid Application Message State(s) |
| D009 | B | MessageHistoryBuffer | Retrieve: Same Message Buffer |
| D010 | B | AuthorizedConnectionList | Retrieve: Allowed Logical Connection List |
| Order Message Data | | | |
| D011 | M | Side | Extract: Order Message Side |
| D012 | M | Symbol | Extract: Order Message Symbol |
| D013 | M | Price | Extract: Order Message Price |
| D014 | M | Quantity | Extract: Order Message Quantity |
| D015 | M | Type | Extract: Order Message Type |
| D016 | M | Duration | Extract: Order Message Duration |
| D017 | M | TimeInForce | Extract: Order Message Time In Force |
| D018 | M | ParticipantID | Extract: ParticipantID |
| Static/Dynamic/Calculated Data | | | |
| D019 | B | RestrictedSymbolList | LookupTable; LookupValue: Symbol/Broker/RestrictionType |
| D020 | B | ForeignRestrictionList | LookupTable; LookupValue: Symbol/Broker/LimitType/LimitValue |
| D021 | B | CurrentPositionList | LookupTable; LookupValue: Symbol/Broker/Side/Position |
| D022 | B | CurrentAvailabilityList | LookupTable; LookupValue: Symbol/Broker/Availability [Repeat Broker/Availability for N PBs] |
| D023 | B | AvailableCashList | LookupTable; LookupValue: Account/Bank/Balance |
| D024 | B | SymbolList | LookupTable; LookupValue: Symbol/Sector/Scope/Price/Quantity [Populated by Symbol-Specific Rues] |
| D025 | B | OrderBook | LookupTable; LookupValue: Current Symbol-Specific Exchange Order Book [Top (3 or 5?) Levels Retained in Block RAM; Remaining Levels Retained in (QDR or DDR?)] |
| D026 | B | OrderHistoryBuffer | LookupTable; LookupValue: Side/Symbol/Price/Quantity/Type/Duration [X Seconds Retained in Block RAM; Y Seconds Retained in QDR; Z Seconds Retained in DDR] |
| D027 | B | OrderOpenBuffer | LookupTable; LookupValue: Side/Symbol/Price/Quantity/Type/Duration |
| D028 | B | ExchangeStatus | LookupTable; LookupValue: Symbol/TradingStatus |
| D029 | B | ExchangeDelisting | LookupTable; LookupValue: Symbol/DelistingDate |
| D030 | B | ExhchangeDelisted | LookupTable; LookupValue: Symbol/DelistedDate |
| D031 | B | ExchangeEarningsWindow | LookupTable; LookupValue: Symbol/EarningsDate |
| D032 | B | ExchangeRecordDateWindow | LookupTable; LookupValue: Symbol/RecordDate |
| D033 | B | ExchangeCorpActionWindow | LookupTable; LookupValue: Symbol/CorpActionDate |
| D034 | B | SymbolValueBLOpen | LookupTable; LookupValue: Symbol/Value/ExecutionBroker/PrimeBroker |
| D035 | B | SymbolValueBLExecuted | LookupTable; LookupValue: Symbol/Value/ExecutionBroker/PrimeBroker |
| D036 | B | SymbolValueSLOpen | LookupTable; LookupValue: Symbol/Value/ExecutionBroker/PrimeBroker |
| D037 | B | SymbolValueSLExecuted | LookupTable; LookupValue: Symbol/Value/ExecutionBroker/PrimeBroker |
| D038 | B | SymbolValueSSOpen | LookupTable; LookupValue: Symbol/Value/ExecutionBroker/PrimeBroker |
| D039 | B | SymbolValueSSExecuted | LookupTable; LookupValue: Symbol/Value/ExecutionBroker/PrimeBroker |
| D040 | B | SymbolQuantityBLOpen | LookupTable; LookupValue: Symbol/Value/ExecutionBroker/PrimeBroker |
| D041 | B | SymbolQuantityBLExecuted | LookupTable; LookupValue: Symbol/Quantity/ExecutionBroker/PrimeBroker |
| D042 | B | SymbolQuantitySLOpen | LookupTable; LookupValue: Symbol/Quantity/ExecutionBroker/PrimeBroker |
| D043 | B | SymbolQuantitySLExecuted | LookupTable; LookupValue: Symbol/Quantity/ExecutionBroker/PrimeBroker |
| D044 | B | SymbolQuantitySSOpen | LookupTable; LookupValue: Symbol/Quantity/ExecutionBroker/PrimeBroker |
| D045 | B | SymbolQuantitySSExecuted | LookupTable; LookupValue: Symbol/Quantity/ExecutionBroker/PrimeBroker |
| D046 | B | SymbolOrderResTimeBL | LookupTable; LookupValue: Symbol/CalculationResult |
| D047 | B | SymbolOrderResTimeSL | LookupTable; LookupValue: Symbol/ CalculationResult |
| D048 | B | SymbolOrderResTimeSS | LookupTable; LookupValue: Symbol/ CalculationResult |
| D049 | B | SymbolVenueExecutedValue | LookupTable; LookupValue: Symbol/TotalExchangeExecutedValue |
| D050 | B | SymbolVenueExecutedQuantity | LookupTable; LookupValue: Symbol/TotalExchangeExecutedQuantity |
| D051 | B | SendAuthStabilization | LookupTable; LookupValue: Sender/Symbol/Stabilization.Flag |
| D052 | B | SendAuthBuyBack | LookupTable; LookupValue: Sender/Symbol/BuyBack.Flag |
| D053 | B | SendAuthPublicPolicy | LookupTable; LookupValue: Sender/Symbol/PublicPolicy.Flag |
| D054 | B | SymbolValueStdDev | LookupTable; LookupValue: Symbol/TradingSegment/ValueStdDev |
| D055 | B | SymbolQuantityStdDev | LookupTable; LookupValue: Symbol/TradingSegment/QuantityStdDev |
| D056 | B | SymbolVenueOpenValue | LookupTable; LookupValue: Symbol/TotalExchangeExecutedValue |
| D057 | B | SymbolVenueOpenQuantity | LookupTable; LookupValue: Symbol/TotalExchangeExecutedQuantity |

FIG. 5

| ID | CP Name | Formula | Description | SE | EB | PB | Rewrite | Reject | Alert |
|---|---|---|---|---|---|---|---|---|---|
| Message Integrity - Network | | | | | | | | | |
| Y | ValidSeqNum | IsValid? D001 | Validate network protocol sequence number. | Y | | | Y | N/A | |
| Y | ValidMsgType | IsValid? D002 IN D003 | Validate message type is valid given current network state. | Y | | | | Y | Y |
| Y | RepeatMessage | IsRepeat? MsgData = MsgData in N Messages in X Seconds | Validate whether message is repeat and if so whether limit is exceeded. | Y | | | | Y | Y |
| Message Integrity - Application | | | | | | | | | |
| Y | ValidSeqNum | IsValid? D006 | Validate application protocol sequence number. | Y | | | Y | N/A | |
| Y | ValidMsgType | IsValid? D007 IN D008 | Validate message type is valid given current application state. | Y | | | | Y | Y |
| Y | RepeatMessage | # Same Messages in X Seconds | Validate whether message is repeat and if so whether limit is exceeded. | Y | | | | Y | Y |
| Message Integrity - Order | | | | | | | | | |
| Y | ValidOrder | Exist? Minimum Required Parameters. | Validate order message contains minimum required parameters and that all are valid. | Y | | | | Y | Y |
| Y | ValidSymbol | Exist? Valid Symbol | Validate order message contains valid symbol. | Y | | | | Y | Y |
| Y | ValidPrice | Exist? Valid Price | Validate order message contains valid price. | Y | | | | Y | Y |
| Y | ValidQuantity | Exist? Valid Quantity | Validate order message contains valid quantity. | Y | | | | Y | Y |
| Y | BlockedSymbol | Exist? Symbol Blocked | Validate symbol is tradable. | Y | Y | | | Y | Y |
| Y | ForeignRestriction | Foreign Ownership Restricted? | Validate symbol not applicable to Foreign Ownership Limits. | Y | Y | | | | Y |
| Y | ForeignLimitAction | If Restricted Apply Rule and Action | If Foreign Ownership Limits applicable, apply rule. | Y | | | | Y | Y |
| Y | ParticipantID | Exist? ParticipantID | Validate order message contains valid ParticipantID. | Y | | | | Y | Y |
| Y | Prop/Agency Flag | Exist? Prop/Agency Flag | Validate order message contains valid Prop/Agency Flag... | Y | | | | Y | Y |

| ID | CP Item | Formula | Description | SE | EB | PB | Rewrite | Reject | Alert |
|---|---|---|---|---|---|---|---|---|---|
| Entity Integrity – Risk Mitigation | | | | | | | | | |
| N | AlertCorpAction | Exception? D033 = TRUE | Checks for active corporate action and whether there is an intersection with 1) an existing position; or 2) a newly active security. | Y | | | | | Y |
| N | AlertDelisting[*] | Exception? D030 = TRUE | Checks whether active delisting exists and whether there is an intersection with 1) an existing position; or 2) a newly active security. | Y | Y | Y | | | Y |
| N | AlertEarnings | Exception? D031 = TRUE | Checks whether within earnings window (X days) and whether there is an intersection with 1) an existing position; or 2) a newly active security. | Y | | | | Y | Y |
| N | AlertRecordDate | Exception? D032 = TRUE | Checks whether within record date window (X days) and whether there is an intersection with 1) an existing position; or 2) a newly active security. | Y | Y | | | | Y |
| N | AlertTradeHalt[*] | Exception? D028 = HALT OR D028 = RESUME | Checks whether there is a trade halt and whether there is an intersection with 1) an existing position; or 2) a newly active security. | Y | Y | | | Y | Y |
| N | AlertTradeRestriction[*] | Exist? | Checks whether there is a trade restriction and whether there is an intersection with 1) an existing position; or 2) a newly active security. | Y | Y | | | Y | Y |
| Y | AucAmCloseQuantitySymbol[*] | Exception? (D014) > (AmCloseStdDevQty * X)) | Checks whether order quantity exceeds THRESHOLD. | Y | Y | | | Y | Y |
| Y | AucAmCloseValueSymbol[*] | Exception? (D013*D014) > ((AmCloseStdDevQty * X) * MarketPrice [IF NOT EXISIT] PreviousClose) | Checks whether order value exceeds THRESHOLD. | Y | Y | | | Y | Y |
| Y | AucAmOpenQuantitySymbol[*] | Exception? (D014) > (AmOpenStdDevQty * X)) | Checks whether order quantity exceeds THRESHOLD. | Y | Y | | | Y | Y |
| Y | AucAmOpenValueSymbol[*] | Exception? (D013*D014) > ((AmOpenStdDevQty * X) * PreviousClose) | Checks whether order value exceeds THRESHOLD. | Y | Y | | | Y | Y |
| Y | AucPmCloseQuantitySymbol[*] | Exception? (D014) > (PmCloseStdDevQty * X)) | Checks whether order quantity exceeds THRESHOLD. | Y | Y | | | Y | Y |
| Y | AucPmCloseValueSymbol[*] | Exception? (D013*D014) > ((PmCloseStdDevQty * X) * MarketPrice [IF NOT EXISIT] PreviousClose) | Checks whether order value exceeds THRESHOLD. | Y | Y | | | Y | Y |

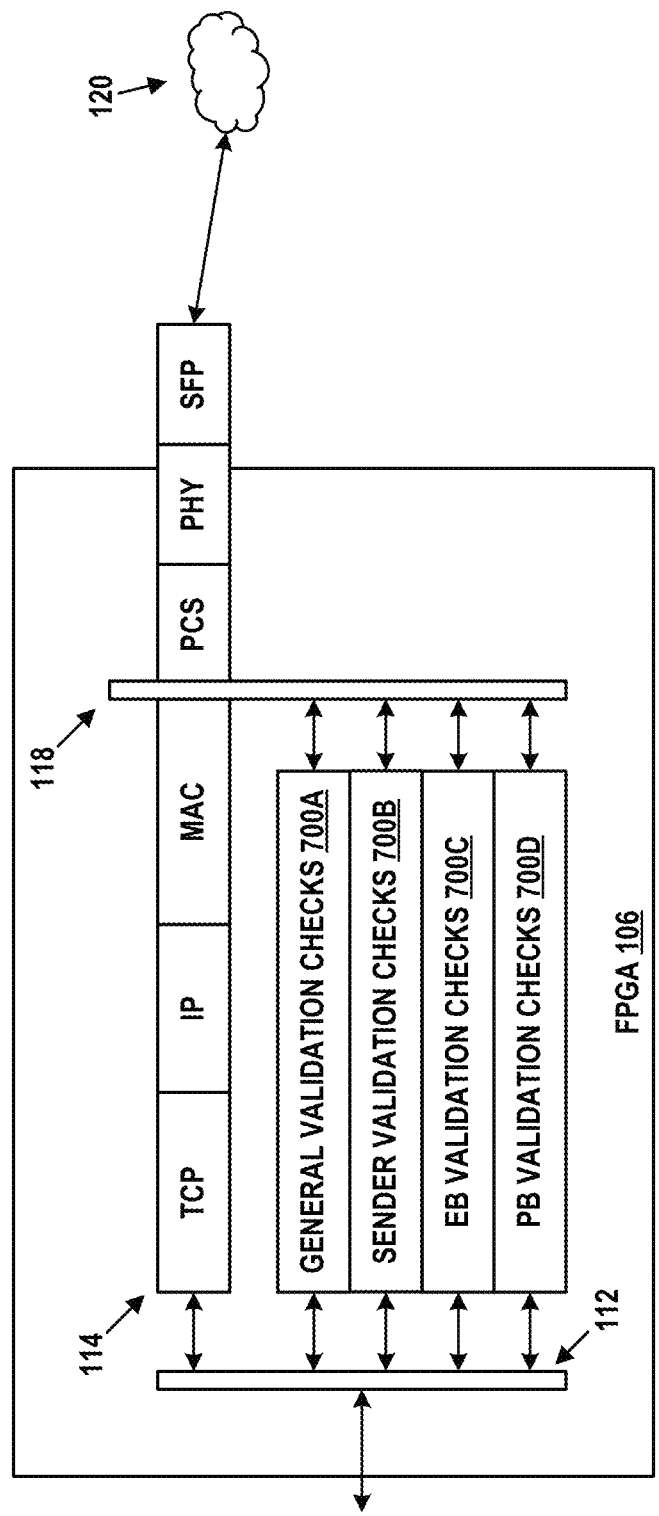

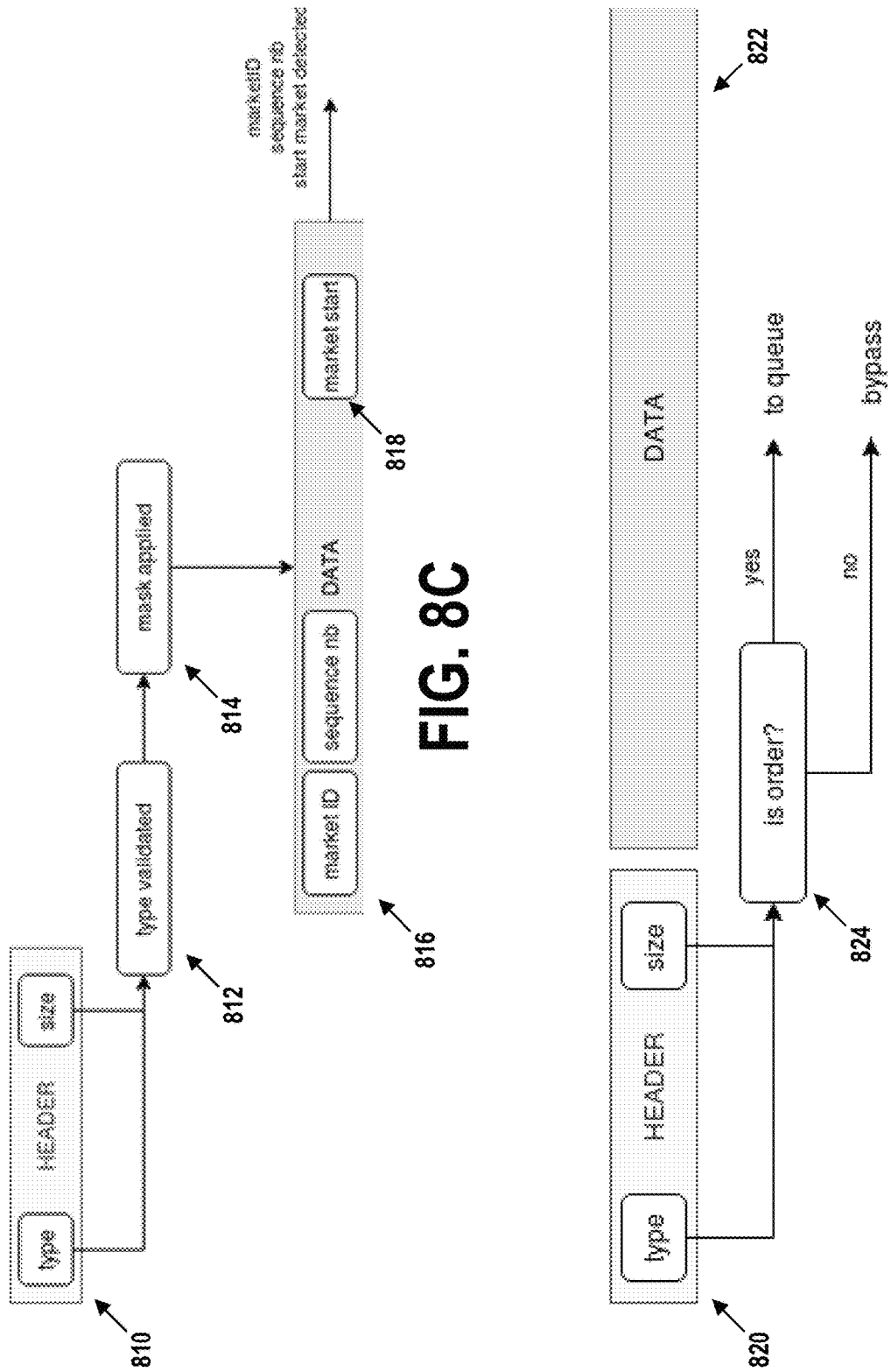

US 10,868,707 B1

ZERO-LATENCY MESSAGE PROCESSING WITH VALIDITY CHECKS

CROSS-REFERENCE TO RELATED APPLICATION

This application claims priority to U.S. provisional patent application No. 62/900,878, filed Sep. 16, 2019, which is hereby incorporated by reference in its entirety.

BACKGROUND

Rapid processing of data messages (which appear on networks in the form of packets or frames) is desirable in numerous technical fields, from routing to security to transaction processing. With network speeds increasing to gigabits per second and beyond, the amount of time available for low-latency message processing has shrunk to a few hundreds—or even a few tens—of nanoseconds. If more time than this is required per message, transmission of these messages would be delayed until the processing is complete. This eliminates most, if not all, software-based processing solutions from being viable candidates for low-latency processing.

SUMMARY

The embodiments herein involve customized hardware-based message processing solutions. In particular, particular locations or fields within incoming and outgoing messages are parsed and validated in parallel to the messages being processed by a network protocol stack. This results in the messages either being validated or rejected by the time that the network protocol stack processing is complete. As a result, the content of the messages can be analyzed with zero latency beyond that which is introduced by the stack. Proactively discarding invalid messages can dramatically decrease the processing overhead of invalid messages that would otherwise be required at downstream software applications.

A first example embodiment may involve a network interface configured to transmit and receive frames on a network. The first example embodiment may also involve a network protocol stack configured to: (i) perform encapsulation of outgoing messages into outgoing frames for transmission by way of the network interface, and/or (ii) perform decapsulation of incoming frames received by way of the network interface into incoming messages. The first example embodiment may also involve a parsing and validation module configured to: (i) receive representations of the incoming and/or the outgoing messages, and (ii) perform one or more validation checks on the representations, wherein the representations define transactions that are functionally equivalent to corresponding transactions that are defined by the messages, wherein the one or more validation checks are performed in parallel to performance of the encapsulation and/or decapsulation, and wherein a representation of a message failing the one or more validation checks causes the message to be discarded.

A second example embodiment may involve receiving, by way of a bus, an outgoing message. The second example embodiment may also involve providing the outgoing message to a network protocol stack and providing a representation of the outgoing message to a parsing and validation module, wherein the representation defines a transaction that is functionally equivalent to a corresponding transaction that is defined by the outgoing message. The second example embodiment may also performing, by the network protocol stack, encapsulation of the outgoing message into an outgoing frame. The second example embodiment may also performing, by the parsing and validation module, one or more validation checks on the representation, wherein the one or more validation checks are performed in parallel to performance of the encapsulation, wherein the representation failing the one or more validation checks causes the outgoing frame to be discarded, and wherein the representation passing the one or more validation checks causes the outgoing frame to be transmitted by way of a network interface.

A third example embodiment may involve receiving, by way of a network interface, an incoming frame. The third example embodiment may also involve providing the incoming frame to a network protocol stack and providing a representation of the incoming frame to a parsing and validation module, wherein the representation defines a transaction that is functionally equivalent to a corresponding transaction that is defined by the incoming frame. The third example embodiment may also involve performing, by the network protocol stack, decapsulation of the incoming frame into an incoming message. The third example embodiment may also involve performing, by the parsing and validation module, one or more validation checks on the representation, wherein the one or more validation checks are performed in parallel to performance of the decapsulation, wherein the representation failing the one or more validation checks causes the incoming message to be discarded, and wherein the representation passing the one or more validation checks causes the incoming message to be transmitted by way of a bus.

Further embodiments may include procedures carried out by computing devices in accordance with the first, second, and/or third example embodiments, as well as a computer-readable medium containing program instructions that, when executed, carry out operations of the first, second, and/or third example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 5 is a table of data sources, in accordance with example embodiments.

FIGS. 6A and 6B are a table of rules, in accordance with example embodiments.

FIG. 7 illustrates the processing hardware supporting multiple types of validation checks, in accordance with example embodiments.

FIG. 8C illustrates message header processing and data field masking, in accordance with example embodiments.

FIG. 8D illustrates message header processing to determine data content, in accordance with example embodiments.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into various logical or physical components or various "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Network Device

The following embodiments describe architectural and operational aspects of example devices and systems that may employ the disclosed implementations, as well as the features and advantages thereof.

Figure 1A:
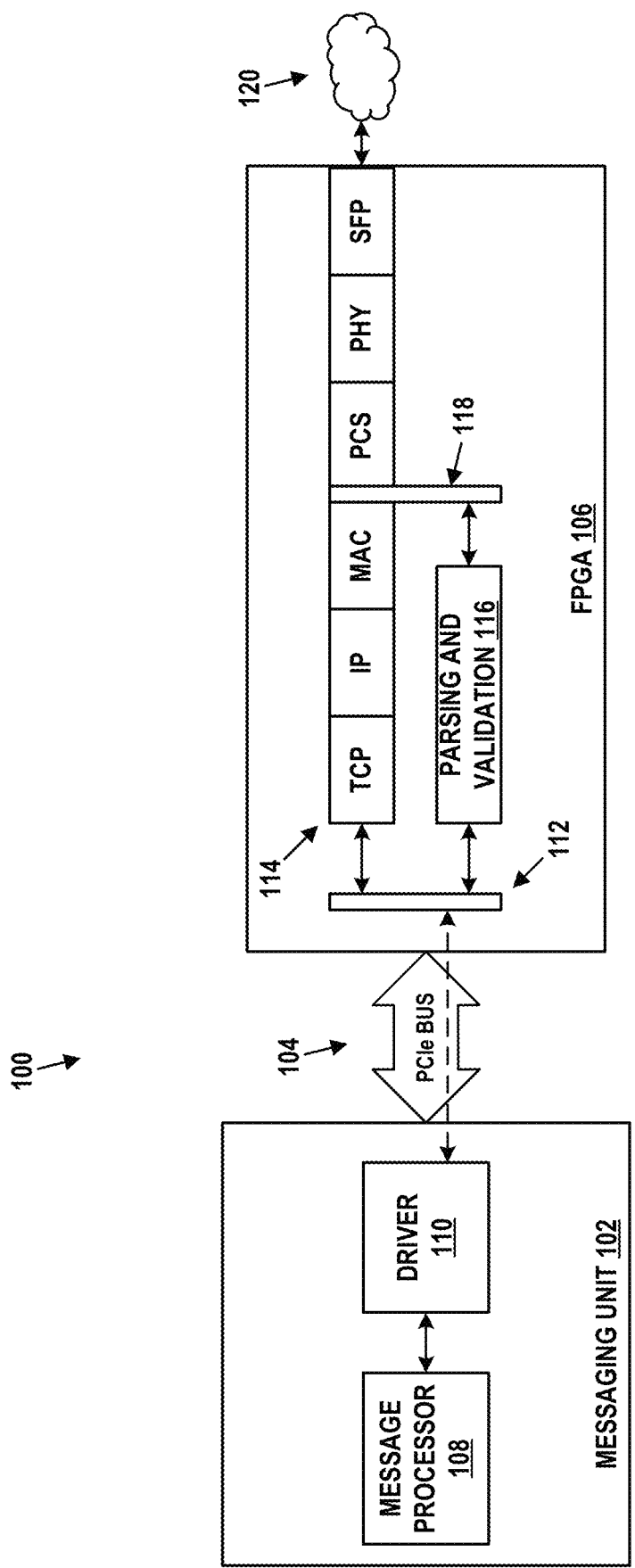
FIG. 1A is a schematic drawing of processing hardware, in accordance with example embodiments.

FIG. 1A is a simplified block diagram exemplifying a device 100 that includes messaging unit 102, peripheral component interconnect express (PCIe) bus 104, and field-programmable gate array (FPGA) 106. Device 100 may be a server device including one or more processors, memory units, other busses and peripherals that are not shown. Alternatively, device 100 may be a chassis or enclosure in which various hardware units can be integrated. Other examples are possible, including an environment where FPGA 106 plugs into a PCIe interface of a powered rack. In this latter example, the PCIe interface may supply only power, messaging unit 102 does not exist as shown, and FPGA 106 carries out its functions on frames received from network 120.

Messaging unit 102 includes message processor 108 and driver 110. Message processor 108 may be any software-based or hardware-based application that generates and/or receives messages. These messages may be application layer messages that make up various types of transactions that take place between message processor 108 and other applications. For example, the transactions may be between device 100 and other devices. Example applications may be directed to network security, information technology operations, industrial control, or financial services, just to name a few. Messages may be some number of bytes (e.g., a few tens or hundreds of bytes) and may be sized in order to fit into a single packet or frame. In some cases, the messages may be text based, but could take other forms.

Driver 110 may be software that interfaces message processor 108 to PCIe bus 104. Thus, driver 100 may facilitate reading from and writing to PCIe bus 104, among other capabilities. To the extent that messaging unit 102 involves software, device 100 may use the aforementioned processor(s) and/or memory unit(s) to facilitate its functionality.

PCIe bus 104 may connect messaging unit 102 to FPGA 106. Thus, PCIe bus 104 may allow two-way communication between messaging unit 102 and FPGA 106. In some embodiments, other types of busses, such as InfiniBand, RapidIO, HyperTransport, QuickPath Interconnect (QPI), or Mobile Industry Processor Interface (MIPI), could be used.

FPGA 106 represents an arrangement of hardware logic disposed upon a printed circuit board (PCB), for example. In some embodiments, other types of integrated circuit technology, such as an application-specific integrated circuit (ASIC) could be used in place of FPGA 106. FPGA 106 includes hardware logic for control module 112, network protocol stack 114, parsing and validation module 116, and control module 118. Some or all of FPGA 106 may be encrypted such that any program logic or data stored therein cannot be read in its plaintext form or modified without use of a secret encryption key.

Control module 112 may be configured to route messages received by way of PCIe bus 104 (outgoing messages) to network protocol stack 114 and/or parsing and validation module 116. In some cases, the same message received by way of PCIe bus 104 may be routed to both network protocol stack 114 and parsing and validation module 116. In other cases, parts of an outgoing message may be routed to network protocol stack 114 while other parts of the outgoing message may be routed to parsing and validation module 116. Further, certain types of outgoing messages may be routed to one or the other of network protocol stack 114 and parsing and validation module 116.

Control module 112 may also be configured to receive messages in the form of payloads of packets or frames received by network protocol stack 114 (incoming messages) along with signals from parsing and validation module 116 regarding the validity of these incoming messages. Control module 112 may provide valid incoming messages on to messaging unit 102 by way of PCIe bus 104, and may discard invalid incoming messages. Discarded incoming messages may be logged and one or more error indications may be made available.

Network protocol stack 114 may include modules providing Transmission Control Protocol (TCP) processing, Internet Protocol (IP) processing, medium-access control (MAC) processing, as well as the physical coding sublayer (PCS), physical layer (PHY), and small form-factor pluggable (SFP) transceiver of a network interface. In some embodiments, an SFP+, SFP28, QSFP+, or QSFP28 transceiver could be used in place of the SFP module. Network protocol stack 114 may also support the User Datagram Protocol (UDP) and/or other transport layer protocols instead of or in addition to TCP. For purposes of convenience, TCP is used as an example transport layer protocol for the disclosure herein, but it could be replaced by UDP for instance.

Network protocol stack 114 may be arranged to be able to support both transmission and reception of MAC (data link layer) frames, such as Ethernet frames. Thus, outgoing messages received by way of PCIe bus 104 can be encapsulated in TCP, IP, and MAC headers, and then transmitted as MAC frames to network 120. Conversely, incoming messages in MAC frames received from network 120 may have their MAC, IP and TCP headers stripped off (in whole or in part), and then these incoming messages are transmitted on PCIe bus 104.

In some embodiments, the SFP module may be arranged to operate in accordance with 100 megabit per second Ethernet, 1 gigabit per second Ethernet, 10 gigabit per second Ethernet, 40 gigabit per second Ethernet, 100 gigabit per second Ethernet, or some other speed or type of MAC protocol. Other types of Ethernet or other types of MAC layer protocols may be supported.

Throughout this disclosure, the terms "frame" and "packet" may be used somewhat interchangeably for purposes of convenience. Nonetheless, frames generally refer to units of data that include a MAC header, while packets refer to units of data that include an IP header but not a MAC header. Thus, in general, frames may encapsulate packets.

Parsing and validation module 116 may include digital logic that analyzes and checks certain parts of outgoing or incoming messages. This analysis and checking may be performed on a copy of these parts of the messages, and therefore may operate in parallel to network protocol stack 114. Detailed examples of such checks may be application-specific and some examples are provided below. In general, messages that fail one or more checks may be discarded and further processing or transmission of these messages may be curtailed. On the other hand, messages that pass these checks may be permitted to continue through FPGA 106. To facilitate this and other possible activity, parsing and validation module 116 may include or have access to memory (not shown) containing rules for the parsing and analysis as well as associated data (e.g., pre-defined threshold values).

Control module 118 may be disposed between the MAC and PCS modules of network protocol stack 114, and may be in communication with parsing and validation module 116. For outgoing messages, control module 118 may determine whether to discard the frames containing these messages from network protocol stack 114. For incoming messages, control module 118 may provide a copy of some or all of the frames containing the messages to parsing and validation module 116.

In summary, outgoing message processing messaging may occur as follows. Messaging unit 102 may provide an outgoing message from message processor 108 to driver 110. This outgoing message may be application data from an application executed by one or more processors in the same or a different chassis or enclosure. Driver 110 may transmit the outgoing message over PCIe bus 104 to FPGA 106. Control module 112 may provide the outgoing message to network protocol stack 114. Control module 112 may also provide a representation of the outgoing message to parsing and validation module 116. The representation may be a copy, part, or custom encoding of the outgoing message that characterizes elements of the message.

Network protocol stack 114 may encapsulate the outgoing message in TCP, IP, and MAC headers. Parsing and validation module 116 may apply one or more validity checks to the representation of the outgoing message. If the representation is deemed valid, parsing and validation module 116 may indicate to network protocol stack 114 that the outgoing message is valid, and the encapsulated version thereof may continue through network protocol stack 114 and then get transmitted to network 120. If the representation is deemed invalid, parsing and validation module 116 may indicate to network protocol stack 114 that the outgoing message is invalid, and then network protocol stack 114 may discard the outgoing message.

In further summary, incoming message processing may occur as follows. Network protocol stack 114 may receive an incoming message, in the form of a MAC frame, from network 120. The incoming message traverses network protocol stack 114 and is received by control module 118. Control module 118 copies a representation of the payload of the incoming message to parsing and validation module 116. The representation may be part of all of the message and/or part or all of some of the headers of the MAC frame that characterizes elements of the message.

Network protocol stack 114 then decapsulates the message by stripping off the MAC, IP, and TCP headers. Parsing and validation module 116 may apply one or more validity checks to the representation of the incoming message. If the representation is deemed valid, parsing and validation module 116 may indicate to control module 112 that the incoming message is valid, and the incoming message may be transmitted to by way of PCIe bus 104. If the representation is deemed invalid, parsing and validation module 116 may indicate to control module 112 that the incoming message is invalid, and then control module 112 may discard the incoming message.

In configurations where messaging unit 102 does not exist and PCIe bus 104 is largely or wholly used to supply power, incoming messages may be received from network 120 and processed as described above. Incoming messages that pass the checks of parsing and validation module 116 may be transmitted back through network protocol stack 114 and to network 120 as outgoing messages. Alternatively, a separate network protocol stack could be used for transmission. Thus, this embodiment allows messages to be validated even if device 100 is not the source or destination of the messages.

As noted above, the processing of network protocol stack 114 and parsing and validation module 116 may occur in parallel. Thus, as long as the processing of parsing and validation module 116 takes no more time than the processing of network protocol stack 114 the validity checks of parsing and validation module 116 effectively have zero latency. This is important in low-latency environments where many millions of transactions per second can be processed.

Also, network protocol stack 114 may carry out standard TCP, IP, and MAC header processing in addition to the functionality described above. Thus, for example, network protocol stack 114 may calculate any necessary checksums or frame check sequences for outgoing packets, and may validate the checksums and frame check sequences for incoming packets.

In general, device 100 may be arranged in various embodiments that can carry out some combination of Open Systems Interconnection (OSI) layer 1, 2, 3, and 4 parsing and analysis functions. Thus, the embodiments herein could be performed by devices and systems that vary in design from device 100. For sake of convenience, the term "device 100" will be used below to refer to any of these embodiments, including but not limited to those of FIG. 1A.

Figure 1B:
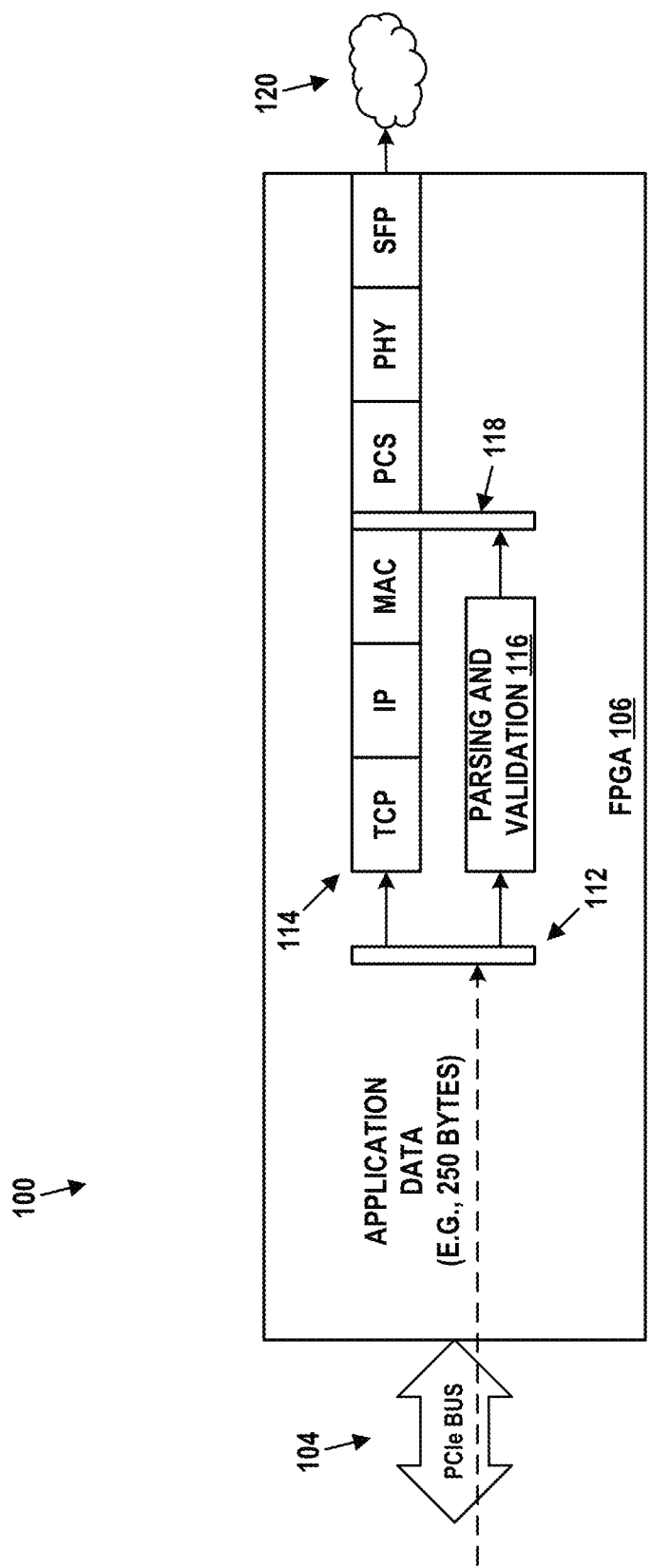
FIG. 1B illustrates data flow through the processing hardware, in accordance with example embodiments.
Figure 1C:
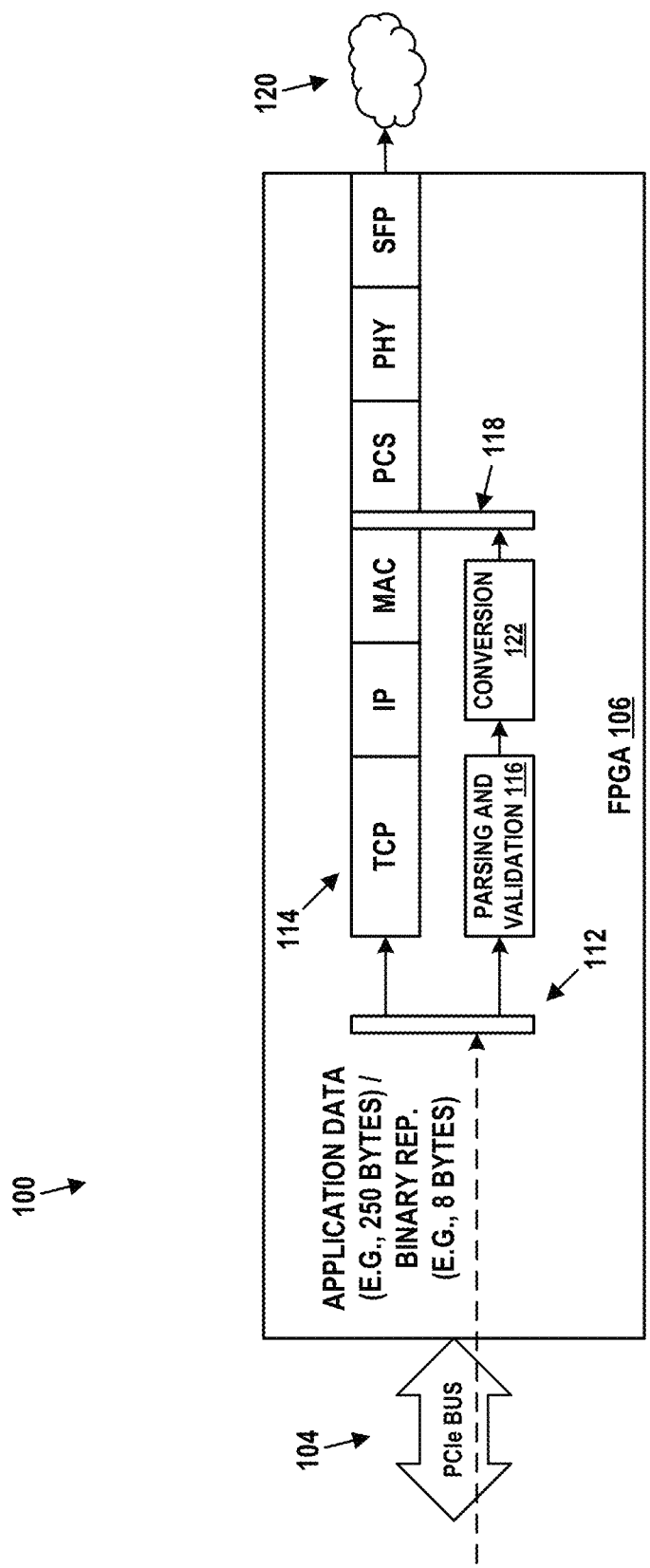
FIG. 1C illustrates another data flow through the processing hardware, in accordance with example embodiments.
Figure 1D:
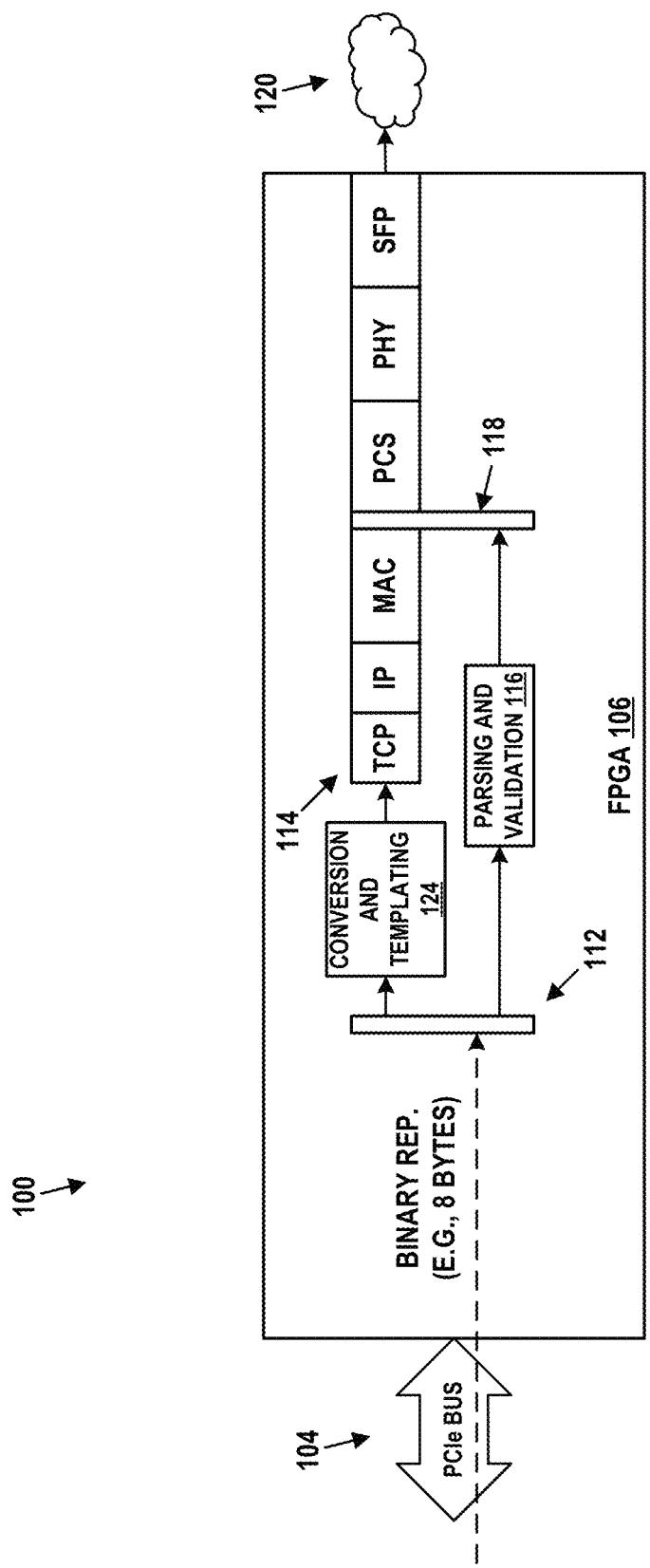
FIG. 1D illustrates another data flow through the processing hardware, in accordance with example embodiments.

FIGS. 1B, 1C, and 1D provide further details with regard to variations of FPGA 106 that can support different outgoing message types and associated functionalities. Each of these variations may assume that messaging unit 102 provides a particular format of outgoing message.

FIG. 1B depicts device 100 with FPGA 106 connected to PCIe bus 104 and network 120. For sake of simplicity, messaging unit 102 is not shown. Notably, messaging unit 102 transmits outgoing messages in the form of application data. This data may have been generated and/or provided by an application executing on device 100 or elsewhere. This application data may be of a particular fixed size (e.g., 200 bytes) or may fall within a pre-established range of sizes (e.g., 200-400 bytes). Herein, the terms "application data" and "message" may be used in a roughly synonymous manner, unless context suggests otherwise.

FPGA 106 processes the application data in accordance with the outgoing message processing discussed above. That is, control module 112 provides the application data to network protocol stack 114 and to parsing and validation module 116. Network protocol stack 114 may encapsulate the application data in TCP, IP, and MAC headers. Parsing and validation module 116 may apply one or more validity checks to the application data. If the application data is deemed valid, parsing and validation module 116 may indicate to network protocol stack 114 (e.g., by way of control module 118) that the application data is valid, and the encapsulated version thereof may continue through network protocol stack 114 and then get transmitted to network 120. If the application data is deemed invalid, parsing and validation module 116 may indicate to network protocol stack 114 (e.g., by way of control module 118) that the application data is invalid, and then network protocol stack 114 may discard the application data and refrain from transmitting an associated frame to network 120.

FIG. 1C depicts a further variation of device 100 that is similar to the variation of FIG. 1B. In FIG. 1C, however, messaging unit 102 transmits outgoing messages in the form of application data and a shorter binary representation thereof. In some embodiments, application data may be of a particular fixed size (e.g., 200 bytes) or may fall within a pre-established range of sizes (e.g., 200-400 bytes) while the binary representation may be of or within a fixed size (e.g., 8 bytes). The binary representation may be a compressed form of some or all of the information within the application data. Examples of such binary representations are provided below. These binary representations may be formed by way of an API in messaging unit 102, for example. This API may receive application data and convert it to the appropriate binary representation.

FPGA 106 processes the application data in accordance with the outgoing message processing discussed above. Thus, control module 112 provides the application data to network protocol stack 114. But control module 112 provides the binary representation to parsing and validation module 116. Network protocol stack 114 may encapsulate the application data in TCP, IP, and MAC headers. Parsing and validation module 116 may apply one or more validity checks to the binary representation. If the binary representation is deemed valid, parsing and validation module 116 may indicate to network protocol stack 114 (e.g., by way of control module 118) that the application data is valid, and the encapsulated version thereof may continue through network protocol stack 114 and then get transmitted to network 120. If the binary representation is deemed invalid, parsing and validation module 116 may indicate to network protocol stack 114 (e.g., by way of control module 118) that the application data is invalid, and then network protocol stack 114 may discard the application data and refrain from transmitting an associated frame to network 120.

Conversion module 122 may involve reformatting the binary representation using an appropriate message template. The message template may specify, for example, the expected arrangement of the corresponding message, e.g., fixed length, delimited by tags, etc. Conversion module 122 may compare the reformatted representation to the application data from messaging unit 102 to determine whether the two different representations are functionally the same. If not, both the binary representation and the application data are discarded.

FIG. 1D depicts a further variation of device 100 that is similar to the variation of FIGS. 1B and 1C. In FIG. 1D, however, messaging unit 102 transmits outgoing messages in the form of a short binary representation. In some embodiments, the binary representation may be of or within a fixed size (e.g., 8 bytes). The binary representation may be a compressed form of some or all of the information within application data generated by messaging unit 102. Examples of such binary representations are provided below. These binary representations may be formed by way of an API in messaging unit 102, for example. This API may receive application data and convert it to the appropriate binary representation.

FPGA 106 processes the binary representation as follows. Control module 112 provides the binary representation to conversion and templating module 124. Conversion and templating module 124 may convert the binary representation into the associated application data that it represents. This application data may be of a particular fixed size (e.g., 200 bytes) or may fall within a pre-established range of sizes (e.g., 200-400 bytes) while the binary representation may be of or within a fixed size (e.g., 8 bytes). Conversion and templating module 124 provides the derived application data to network protocol stack 114. Network protocol stack 114 may encapsulate the application data in TCP, IP, and MAC headers.

In particular, conversion and templating module 124 takes the binary representation of the application data of a message and converts it to the appropriate application data format (ex. fixed-length, string-delimited, or binary), adding, where applicable, fields and/or field values not otherwise included in the binary representation. For example, some protocols require setting particular flags or require an account number or ID field. As these values are uniform across all messages, they are not set in the binary representation but are instead added to the application data representation during the conversion and creation of the application data representation prior to transmission.

Control module 112 also provides the binary representation to parsing and validation module 116. Parsing and validation module 116 may apply one or more validity checks to the binary representation. If the binary representation is deemed valid, parsing and validation module 116 may indicate to network protocol stack 114 (e.g., by way of control module 118) that the application data is valid, and the encapsulated version thereof may continue through network protocol stack 114 and then get transmitted to network 120. If the binary representation is deemed invalid, parsing and validation module 116 may indicate to network protocol stack 114 (e.g., by way of control module 118) that the application data is invalid, and then network protocol stack 114 may discard the application data and refrain from transmitting an associated frame to network 120.

In any of the embodiments of FIG. 1B, 1C, or 1D, control module 118 may insert the binary representation into the MAC header of an outgoing message. The binary representation may be encoded using 802.1Q fields as described below. In the case of FIG. 1B, parsing and validation module may be configured to convert application data into corresponding binary representations.

Figure 1E:
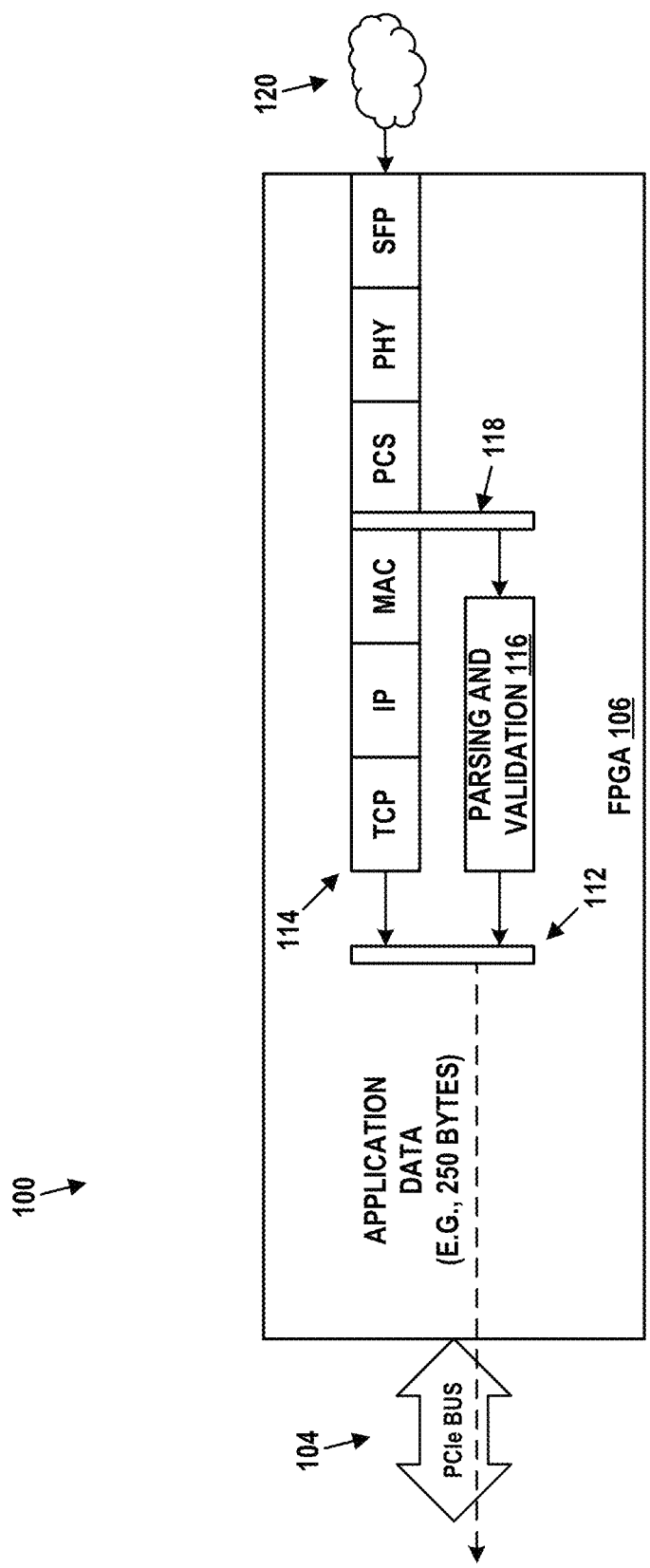
FIG. 1E illustrates another data flow through the processing hardware, in accordance with example embodiments.

FIG. 1E provides further details with regard to variations of FPGA 106 that can support incoming messages and associated functionalities. This embodiment assumes that network 120 provides incoming messages in the form of MAC frames that contain a payload of application data as well as one or more 802.1Q fields with corresponding binary representations of this application data. FIG. 1E depicts device 100 with FPGA 106 connected to PCIe bus 104 and network 120. For sake of simplicity, messaging unit 102 is not shown.

As noted above, the application data may be of a particular fixed size (e.g., 200 bytes) or may fall within a pre-established range of sizes (e.g., 200-400 bytes) while the binary representation may be of or within a fixed size (e.g., 8 bytes). The binary representation may be a compressed form of some or all of the information within the application data. Examples of such binary representations are provided below.

FPGA 106 processes an incoming message as follows. Network protocol stack 114 receives the MAC frame containing the incoming message from network 120. Before or during MAC processing, the binary representation in the 802.1Q fields is copied or removed by control module 118. Control module 118 provides this binary representation to parsing and validation module 116. Network protocol stack 114 continues processing the frame, stripping off the MAC, IP, and TCP headers.

Parsing and validation module 116 may apply one or more validity checks to the binary representation. If the binary representation is deemed valid, parsing and validation module 116 may indicate to control module 112 that the application data is valid. If the binary representation is deemed invalid, parsing and validation module 116 may indicate to control module 112 that the application data is invalid. In response, control module 112 may transmit valid application data over PCIe bus 104 to messaging unit 102, and may discard invalid application data.

Figure 1F:
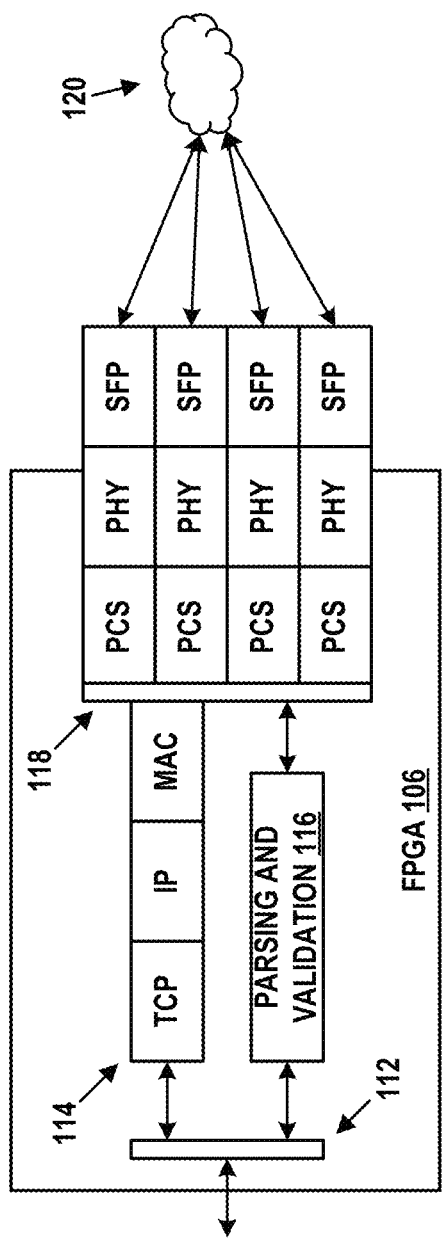
FIG. 1F illustrates the processing hardware with multiple network interfaces, in accordance with example embodiments.

FIG. 1F depicts an optional embodiment in which multiple input/output ports are supported on FPGA 106. Particularly, there are four such ports encompassing four distinct arrangements of the PCS/PHY/SFP modules. Each of these ports may utilize the same MAC module. Also, all four ports are shown connecting to network 120, but in other arrangement different ports can connect to different networks. FIG. 1F also shows that the SFP module and part of the PHY module may extend from FPGA 106. Thus, in some cases, at least the SFP module might not be part of FPGA 106, and may instead be placed on the PCB on which FPGA 106 is disposed. Nonetheless, for purposes of simplicity, SFP modules may be considered to be part of either FPGA 106 or such a PCB.

Figure 1G:
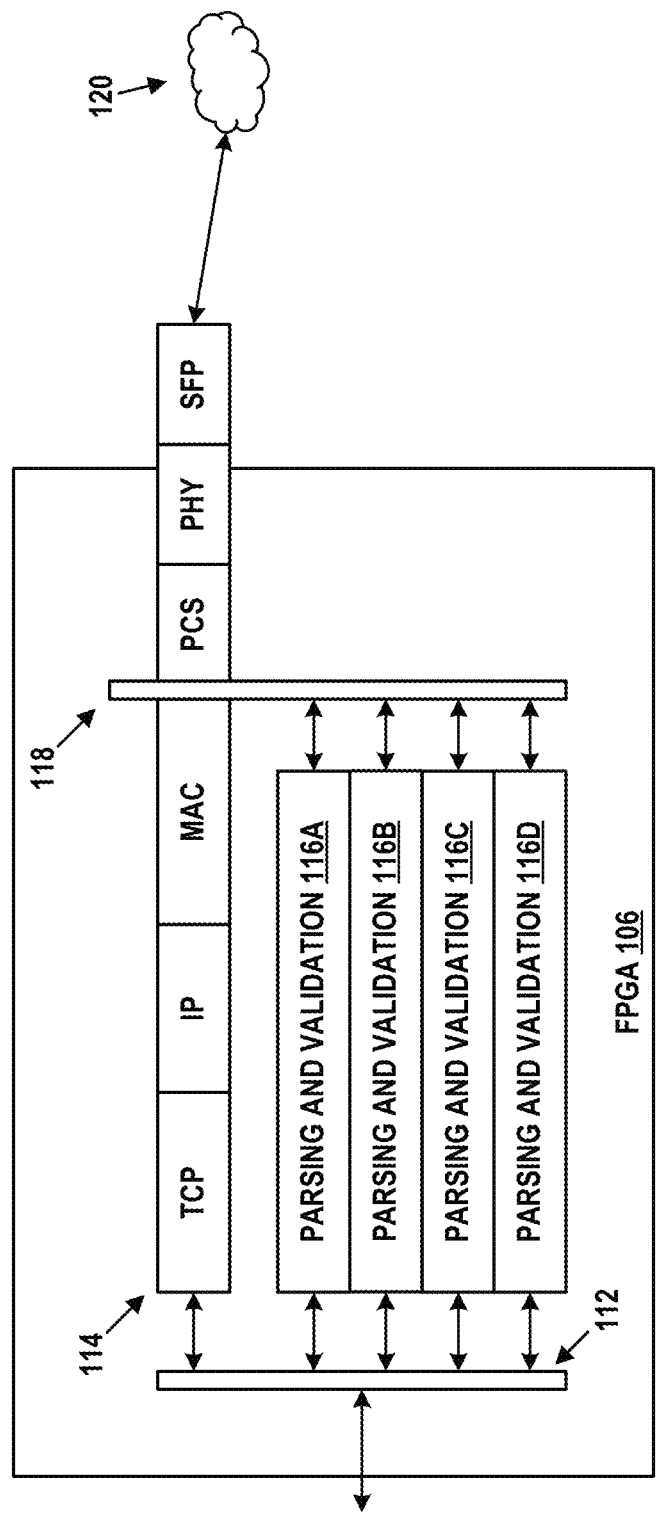
FIG. 1G illustrates the processing hardware with multiple parsing and validation modules, in accordance with example embodiments.

FIG. 1G depicts another optional embodiment in which multiple parsing and validation modules are present. In particular, parsing and validation modules 116A, 116B, 116C, and 116D may each be configured to perform different validation checks in parallel to one another and to the processing of network protocol stack 114. These parsing and validation modules may operate independently or may share some logic and/or data. In general, each parsing and validation module's checks must pass in order for a message to be considered valid. Thus, control module 112 (for incoming messages) or control module 118 (for outgoing messages) may perform the equivalent of a logical AND operation on the results from all of the parsing and validation modules' checks. If the outcome of this AND is false, then the message may be discarded. Otherwise the message may be processed further. Notably, the embodiments of FIGS. 1F and 1G may be combined.

For any of the embodiments of FIGS. 1A-1G or any combination thereof, outgoing and incoming messages may be processed simultaneously and in parallel.

II. Example Ethernet Frames and 802.1Q Fields

As noted above, binary representations of messages can be used as compact versions of these messages. These binary representations may appear in frames in 802.1Q fields. This section describes 802.1Q fields and how they can be used for this purpose.

Figure 2:
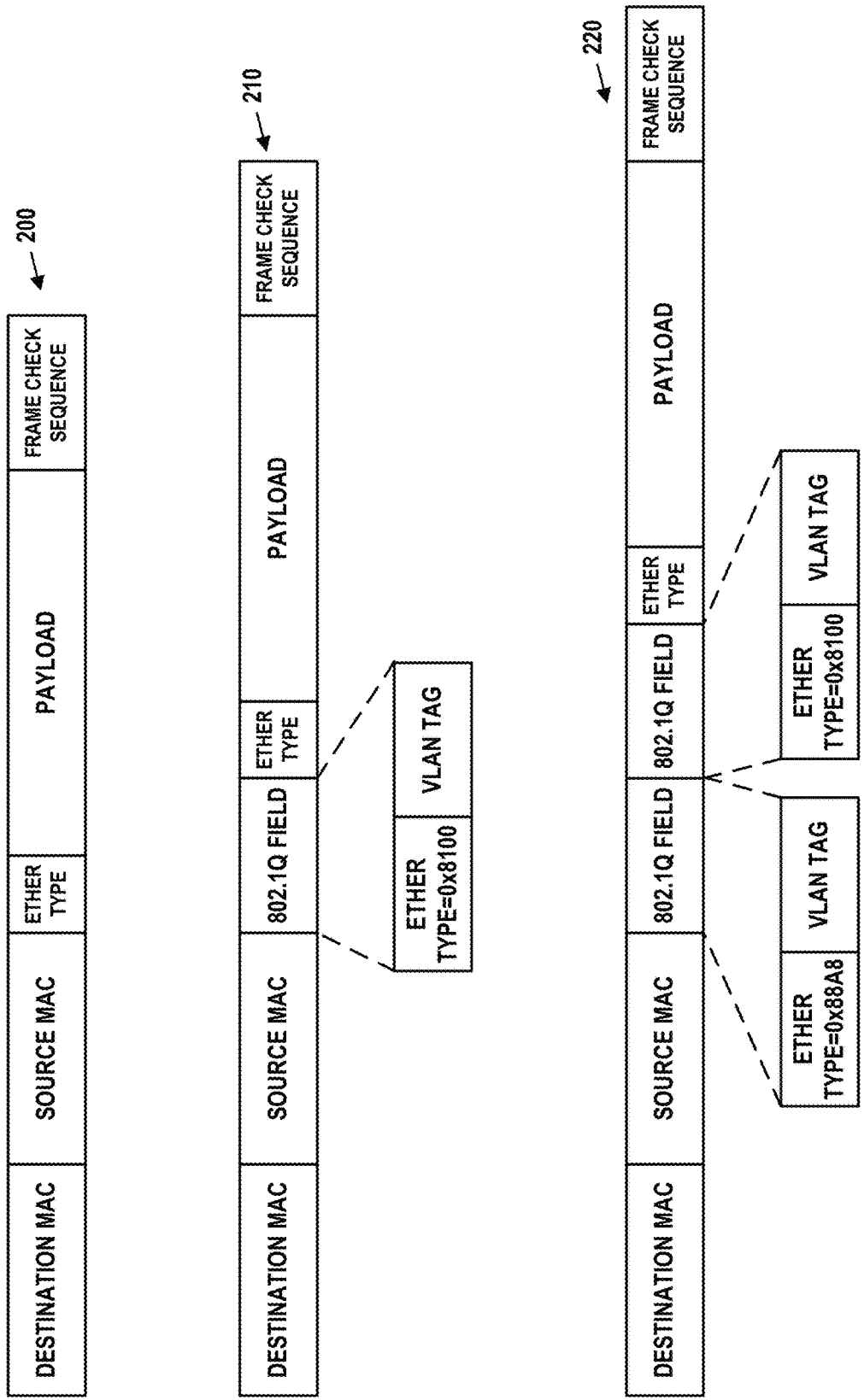
FIG. 2 illustrates data-link layer frame formats, in accordance with example embodiments.

FIG. 2 depicts three examples of Ethernet frames. Frame 200 does not contain any 802.1Q fields, while frame 210 contains one such field and frame 220 contains two of these fields.

Frame 200 is a standard Ethernet frame appearing left to right as it would be transmitted from one point and received at another point. Thus, the destination MAC field would be transmitted first and the frame check sequence would be transmitted last.

The destination MAC address field may contain a 6-byte Ethernet destination address (e.g., 08-16-a2-4c-bb-02). The source MAC address field may contain a similarly formatted 6-byte Ethernet source address. The ethertype field indicates the type of payload that frame 200 encapsulates. If this is an IP packet, the ethertype is 0x0800.

After the payload (which may be variable length), there is a 4-byte frame check sequence (FCS). The value of the FCS is based on an error checking sequence run over the length of the frame but excluding the FCS bits. The FCS field contains a number that is calculated by the transmitting entity based on the data in the frame. Thus, the transmitting entity calculates the FCS and stores it in the FCS field. When the frame is received, the receiving entity recalculates the FCS and compares it with the FCS value included in the frame. If the two values are different, an error is assumed and the frame is typically discarded.

Frame 210 contains all fields of frame 200, but also a 4-byte 802.1Q field disposed between the source MAC field and the ethertype field. The 802.1Q field contains a 2-byte ethertype field of 0x8100 indicating that it is an 802.1Q field, as well as a 2-byte VLAN tag field which can take on various values. Notably, when an 802.1Q field is added to or removed from a frame, the FCS is recalculated accordingly.

Frame 220 contains all of the fields of frame 210, but also a second 4-byte 802.1Q field disposed between the source MAC field and the previous 802.1Q field. The second 802.1Q field contains a 2-byte ethertype field of 0x8A88 indicating that it is a second 802.1Q field, as well as a 2-byte VLAN tag field which can take on various values.

Although it is not shown in FIG. 2, the VLAN tag portion of an 802.1Q field may consists of 12 or 16 bits. Traditionally, the VLAN tag was 12 bits in length with the other four bits in the 802.1Q field aside from the ethertype being used for designated purposes.

But since the embodiments herein utilize tagging in an unconventional fashion, it may be possible to use all 32 bits in each 802.1Q field. For example, an 802.1Q field may define a transaction. Thus, these embodiments can use between 32 and 64 bits for transaction encoding when two 802.1Q fields are present.

Further, it may be possible to include more than two 802.1Q fields in a single Ethernet frame. In these cases, at least the VLAN tag portions of each may be used for transaction encoding. Arrangements of multiple 802.1Q fields may be in accordance with the IEEE 802.1ad standard, but will be referred to as 802.1Q fields herein.

Not shown in FIG. 2 are the 56-bit (7-byte) Ethernet preamble and 8-bit (1-byte) start frame delimiter (SFD) that precedes the destination MAC address field. Thus, in practice, the 802.1Q field may begin after 8 bytes of preamble and SFD, 6 bytes of destination MAC address, and 6 bytes of source MAC address. This means that the first 802.1Q field may begin at the 21st byte (161st bit) of the frame.

Without limitation, the 802.1Q fields described herein may be referred to as "proprietary" or "non-standard" fields or headers when they deviate from the standard 802.1Q formats.

III. Example Binary Representations

Figure 3:
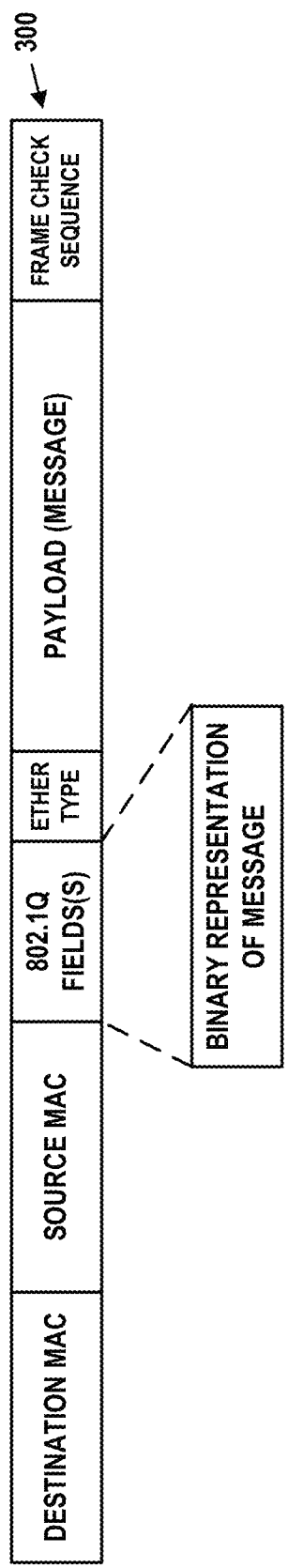
FIG. 3 illustrates representing transactions in one or more fields of a data-link layer frame, in accordance with example embodiments.

The embodiments described in this section provide examples of binary representations of messages. As described above, FPGA 106 may be able to receive and process these representations in parallel to passing information up or down a network protocol stack. Doing so may facilitate rapid processing of the corresponding messages including the performance of complex, multiparty validity checks. While the binary representations may appear outside of the context of frames, FIG. 3 shows how an Ethernet frame could contain such a representation.

Frame 300 includes a message in its payload. Frame 300 may be generated by device 100 or received by device 100. The payload of frame 300 may contain, for example, an IP packet which in turn encapsulates a TCP segment. The payload of the TCP segment may include the message. This message may be in various encodings, such as text (e.g., XML or JSON), binary, or key-value pairs. Further, a non-standard binary representation of the message may be placed in one or more 802.1Q fields. This representation may be a full version of the message or a condensed, functionally equivalent version of the message with enough information to determine the type and nature of the message. Thus, binary encodings may be used for efficiency, but other types of encodings may be used alternatively.

Example types of message vary, but in one example can include machine control transactions. For instance, suppose that a simple manufacturing device has six possible commands—start, stop, move left, move right, move up, and move down. These six commands may be encoded in a text format in the frame's payload, but with only three bits in the 802.1Q fields.

FPGA 106, receiving such a message, may check the values of the three bits to ensure that a valid command is encoded. This may ensure that only frames with valid commands are transmitted on to the next hop device (which may or may not be the destination device). Any other frame may be discarded so that it does not use resources on the next hop device.

In some embodiments, FPGA 106 may keep track of multiple messages from a sender to check whether these messages in aggregate violate a rule or policy. This may involve using memory to store state related to the messages.

For example, the simple manufacturing device may be restricted so that it can move in any one direction no more than 3 times in a row. Thus, FPGA 106 may keep track of the movement direction last three messages that involved movement. If all three of these directions are the same, then FPGA 106 may discard messages containing commands for the manufacturing device to move in the same direction until the manufacturing device first moves in a different direction.

The higher-level checks may involve finding a field in a plurality of fields encoded in the payload. This field may be associated with a starting bit location and an ending bit location, and field extractor logic may be programmed to obtain the field based on the starting bit location and the ending bit location. The starting and ending bit locations may be fixed or variable. Multiple fields can be found in this fashion.

Another type of transaction may be a financial transaction. The payload of the data (the message) may contain an instruction to either buy or sell, a name of a security to be bought or sold, and a number of units of that security to be bought or sold. Given that the number of securities supported by a given exchange and the number of units per transaction are usually limited to a few thousand at most, this information can be efficiently encoded in the bits of two or more 802.1Q fields.

TABLE 1

| FieldName | FieldLength | Pos Start | PosEnd | Rules | Description |
|---|---|---|---|---|---|
| Sy | 17 | 161 | 177 | Value Transmitted as Binary | Symbol |
| Si | 2 | 178 | 179 | BL = 00; BC = 01; SL = 10; SS = 11 | Side |
| Qt | 20 | 180 | 199 | Quantity Transmitted as Binary | Quantity |
| Px.P | 1 | 200 | 200 | <0 = 0; >0 = 1 | Positive/negative indicator |
| Px.L | 20 | 201 | 220 | Value Transmitted as Binary | Price (left of decimal) |
| Px.R | 4 | 221 | 224 | Value Transmitted as Binary | Price (right of decimal) |

For example, the structure in Table 1 represents an encoding of the components of a securities order within the 8 bytes (64 bits) of a pair of 802.1Q fields. The Sy field represents the securities symbol in a binary format. The Si field represents the transaction side. The two bits of this field encode the transaction type, such as buy long (BL) when the transaction is a purchase for holding, buy cover (BC) when the transaction is a purchase to close or cover a previous short sale, sell long (SL) when the transaction is a sale of securities that are currently held, and sell short (SS) which creates an obligation to sell (cover) the security at a future time. The Qt field represents the quantity of the transaction as a count of units represented in binary. These units may be either individual securities or lots of two or more. The Px.P field indicates whether the transaction is for a negative or positive number of units. Certain types of asset classes (e.g., futures) in certain exchanges may be specified by convention with a negative price. Thus, this field may represent an arithmetic sign, plus or minus. The Px.L field indicates the portion of the price of the security that is to the left of the decimal point, and the Px.R field indicates the portion of this price that is to the right of the decimal point.

In alternative embodiments, different numbers of bits may be used to encode these fields. For example, 7 bits could be used to encode the Px.R so that two digits to the right of the decimal can be represented. In some embodiments, one or more brokers may be identified in the binary representation. Do to so, a lookup table may contain mappings of source MAC addresses to identifiers of brokers. It is possible, to create further granularity by specifically setting one or more bits in the non-standard binary representation to a particular value. When transmitting from FPGA 106 to network 120, frames with a particular source address might be prevented from accessing more than one execution broker via a specific physical interface. The lookup tables are accessible to the transmission logic via any of the individual physical interface.

As a concrete instance, a transaction involving the long purchase of 100 units of the security ABC Corp., which has a price of $32.40 per unit may be encoded as follows. The Sy field may encode the ticker symbol of ABC Corp. or some other representation thereof (e.g., a unique numerical representation). Since there are 17 bits in the Sy field, $2^{17}=131,072$ different securities can be referenced in this fashion. The Side field may take on a value of 00. The Qt field may encode the value of 100 in binary. The Px.P field may have a value of 1 indicating a positive number of units. The Px.L field may encode 32 in binary and the Px.R field may encode 4 as binary.

Notably, the embodiment and example shown above is just one possibility. Other encoding arrangements may exist. For instance, different trading exchanges and different asset classes could have different encodings within the bits of one or more 802.1Q fields.

FPGA 106 may check the binary representation of a message containing the transaction against one or more per-transaction rules stored in the memory. These rules may be, for example, that no more than a certain number of units of a certain security can be purchased in a single message. FPGA 106 may ensure that frames with valid transactions are transmitted on to the destination device. Any other frame may be discarded so that the destination device is not burdened with having to process the frame.

In some embodiments, FPGA 106 may keep track of multiple transactions associated with a single entity group of entities to check whether these transactions in aggregate violate a rule or policy. This may involve using the memory on FPGA 106 to store state and logic on FPGA 106 to perform higher-level calculations. For example, an entity may be restricted such that it can purchase no more than a maximum number of units of a given security per day, or such that its balance cannot go below a certain value (e.g., $0.00). As noted above, when a rule is violated, the message may be discarded.

Another type of transaction to which these embodiments can be applied is a TCP session in general. TCP sessions begin with an initiating device transmitting a SYN packet, which is followed by the responding device transmitting a SYN/ACK packet, and the initiating device then transmitting an ACK packet. These packet types are determined by flags (e.g., SYN and ACK as just two examples) being set in the respective TCP headers.

But TCP session initiation procedures can be used to generate denial of service (DOS) attacks on the recipient device. For example, one or more initiator devices may transmit numerous TCP SYN packets with no intention of actually using any resulting TCP session. This creates a large amount of state in memory of the recipient device as it waits for these sessions to be used.

In order to mitigate this sort of DOS attack, FPGA 106 may look into IP and TCP headers within a data-link layer frame. If the number of TCP SYN packets transmitted by a particular initiator device exceeds a threshold number per unit of time (e.g., 10 per second), FPGA 106 may begin discarding new TCP SYN packets from this initiator device, or disable the physical input port that the initiator device is using. In an alternative embodiment, FPGA 106 may compare the number of TCP SYN packets transmitted by a particular initiator device to a particular recipient device against such a threshold.

In any of the above embodiments, FPGA 106 may add or remove any non-standard 802.1Q fields used for these validity checking purposes before transmitting the resulting frame (with a new FCS calculation) to a recipient device. Alternatively, these 802.1Q fields may be replaced by all zero values.

Further, in any of the above or other embodiments, FPGA 106 may also handle standard 802.1Q fields in the expected fashion. Thus, for example, before transmitting a frame to a recipient device, FPGA 106 may add one or more standard 802.1Q fields (containing VLAN tags) to the frame and recalculate the FCS accordingly.

IV. Example Low-Level Message Validation Details

This section provides further details to the embodiments described above. Thus, these embodiments may be combined with any of those disclosed in the context of FIGS. 1A-3.

A. Frame Processing

Figure 4:
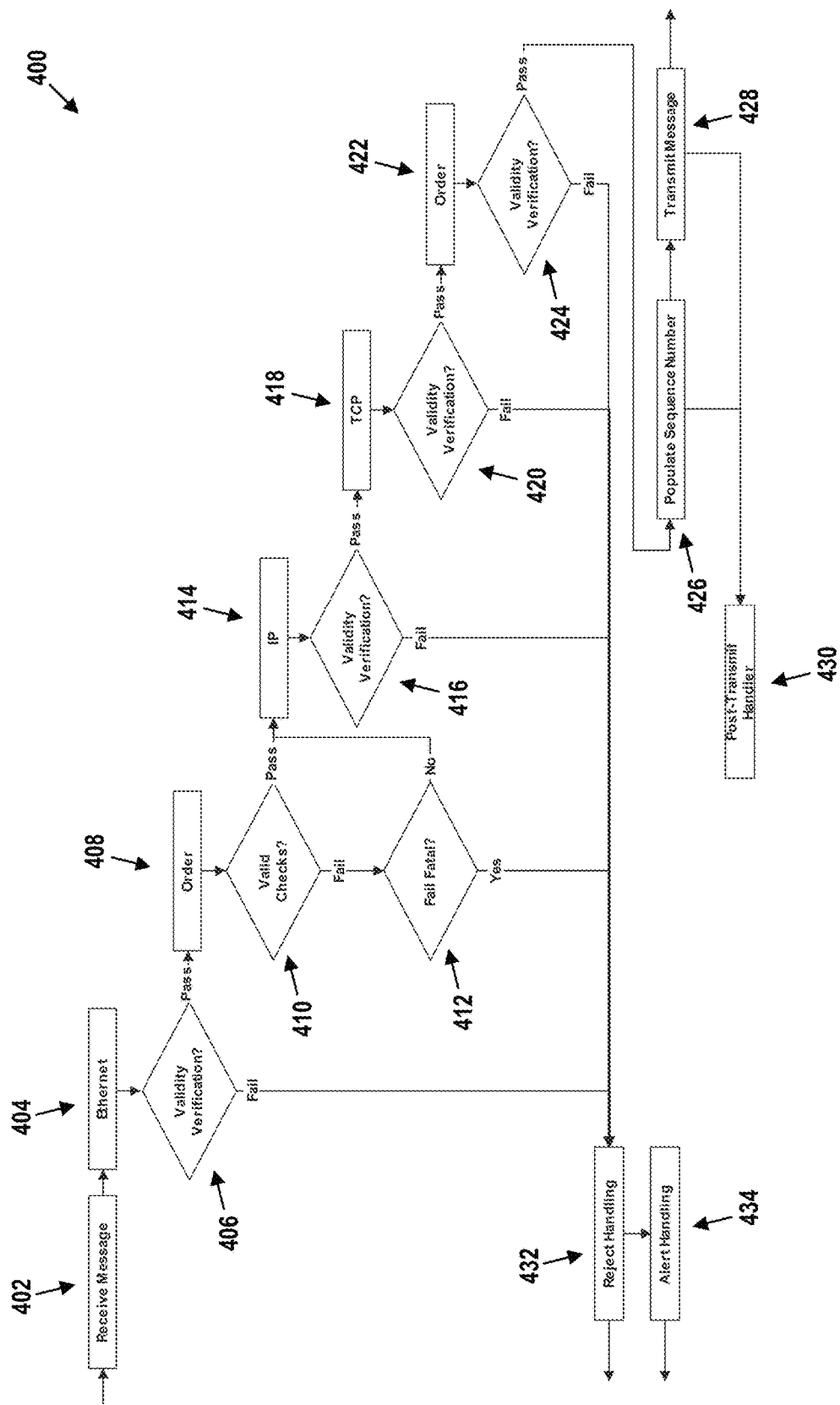
FIG. 4 is a flow chart, in accordance with example embodiments.

Flow chart 400 of FIG. 4 illustrates device 100 processing a binary representation of an incoming message as discussed above. Thus, the binary representation may accompany a message that FPGA 106 receives by way of an Ethernet interface, where the binary representation is encoded using non-standard 802.1Q fields. Similar processing may take place for outgoing messages in which the binary representation is provided by messaging unit 102, but this processing is omitted from flow chart 400 for sake of simplicity.

In either direction, this processing may occur in real time in a cut-through fashion. For incoming messages, a MAC frame is received in order of the bits arranged in its header (e.g., destination MAC address first, source MAC address second and so on). As each field is received, it is processed by FPGA 106. While the embodiments below describe the frame as being received and then processed, this reception and processing may actually occur in parallel. For outgoing messages, the message and/or its binary representation may be received in one or more chunks over PCIe bus 104 and then serialized for processing by network protocol stack 114 and parsing and validation module 116.

At block 402, FPGA 106 receives the message. At block 404, FPGA 106 begins processing of the Ethernet headers. Thus, at block 406, FPGA 106 verifies the validity of these headers. This may include validating the FCS, and determining whether the source and/or destination MAC addresses are permitted. For example, FPGA 106 may be configured to filter out (e.g., discard) frames that are not from a particular set of MAC addresses that correspond to specific source devices. Alternatively or additionally, FPGA 106 may be configured to filter out frames from a particular set of MAC addresses that do not correspond to specific source devices, allowing frames from these source devices through for further processing. This processing may be facilitated by a lookup table that contains whitelists and/or blacklists of MAC addresses. In any event, should a frame be filtered out in this fashion, control is passed to block 432.

If the Ethernet MAC addresses pass the checks of block 406, control is passed to block 408. Block 410 parses the binary representation as encoded in one of more of 802.1Q fields of the frame and applies rules to determine whether the message is valid. This may involve a potentially large number of rules that the logic of parsing and validation module 116 can execute at least partially in parallel. Examples of these rules are given below. If it is determined that the binary representation adheres to all relevant rules, then the message is deemed valid and control passes to block 414. Notably, these rules may involve more than just parsing and analyzing values in one or more 802.1Q fields. In some cases, the rules may require that FPGA 106 maintains a representation of higher level state. Herein, the terms "rules" and "checks" may be roughly synonymous unless context suggests otherwise.

For example, FPGA 106 may maintain a representation of the state of a TCP connection between a source device and a destination device. If this representation indicates that the connection is open, any frames containing TCP header information that is an attempt to open this connection would be discarded as invalid because an open TCP connection cannot be opened again.

If it is determined that one or more rules have been violated, then at block 412 it is further determined whether any of these violations, individually or in combination, are deemed fatal. This may involve applying further rules to one or more fields within the 802.1Q fields and/or other parts of the frame. If the violations are not fatal, control is passed to block 414. Otherwise, control is passed to block 432 and the frame is discarded.

As noted, the rules described herein are application-specific and may vary between deployments. Further, control over the content and execution of these rules may be given to various entities. For example, an entity associated with a source device may mandate that certain rules are used and may have control over the use of these rules, while an entity associated with a destination device may mandate that other rules are used and may have control over the use of these rules. In some cases, an entity associated with neither the source device nor the destination device may mandate that other rules are used and may have control over the use of these rules. As a consequence, the rules that are applied to messages may have originated from various entities.

Block 414 may involve processing the IP header within the Ethernet frame and, at block 416, determining whether it is valid. This may include comparing the source and/or destination IP addresses to whitelists or blacklists, as well as performing validity checks of the values of other IP header fields. Again, these checks may be implemented as rules performed by the logic of FPGA 106. If the IP header is found to be valid, control passes to block 418. Otherwise, control passes to block 432 and the frame is discarded.

Block 418 may involve processing the TCP header within the Ethernet frame and, at block 420, determining whether it is valid. This may include comparing the source and/or destination port numbers to whitelists or blacklists, as well as performing validity checks of the values of other TCP header fields. Once more, these checks may be implemented as rules performed by the logic of FPGA 106. If the TCP header is found to be valid, control passes to block 422. Otherwise, control passes to block 432 and the frame is discarded. Notably, these checks could be for another transport-layer protocol, such as UDP.

Block 422 may involve performing validity checks on the payload of the packet contained within the Ethernet frame (e.g., the message). This payload may also be referred to as the transport-layer payload. Even though the transaction was validated by the processing associated with blocks 408, 412, and/or 412, block 424 may involve further validating that the transaction as it is arranged within this payload is properly formatted and the value in each field is appropriate. For example, it is possible that the transaction in the payload has a formatting error even though its representation in one or more 802.1Q fields is valid. If errors are found in the payload, control passes to block 432 and the frame is discarded. Performing this additional set of checks reduces the possibility that the destination device will have to waste resources processing invalid transactions. If the checks indicate that the payload is valid, then control passes to block 426.

Block 426 may involve populating sequence numbers within the TCP header as well as within the payload. FPGA 106 may discard one or more messages transmitted by the source device to the destination device, but the source device may not be aware that some messages are being discarded. Thus, it will continue to generate sequence numbers for both TCP headers and the payload assuming that the discarded messages were actually received by the destination device. The destination device is also unaware that FPGA 106 may be discarding messages, but expects the sequence numbers received to follow pre-established patterns which they may not.

As a simple example, suppose that the application generating the message uses linearly increasing sequence numbers starting at 1. In each subsequent packet, the sequence number is incremented. Thus, the first frame contains a payload with a sequence number of 1, the second frame contains a payload with a sequence number of 2, the third frame contains a payload with a sequence number of 3, and so on. If FPGA 106 discards the second frame but forwards the first and third frames, the destination device may expect the third frame to have a payload with a sequence number of 2 but instead finds a sequence number of 3. This may cause the destination device to carry out undesirable behaviors, such as discarding the third frame or requesting a retransmission of the data that was within the payload of the second frame. Similar issues may arise at the TCP level where the sequence numbers thereof represent an increasing count (modulo $2^{32}$) of bytes transmitted from sender to recipient.

To accommodate, FPGA 106 may use one or more tables to account for the offsets in sequence numbers due to discarded messages. An example is shown in Table 2.

TABLE 2

| Connection ID | TCP SeqNo Offset | Payload SeqNo Offset |
|---|---|---|
| 1 | 1000 | 1 |
| 2 | 0 | 0 |
| 3 | 5000 | 4 |

In Table 2, the connection ID column refers to a unique connection between the source device and the destination device. This may correspond to a TCP connection or an application-layer session. Thus, the connection ID may be defined by a combination of source and destination MAC addresses, source and destination IP addresses, and/or source and destination port numbers, or in some other fashion. The connection IDs in the table are numeric for sake of simplicity, and may refer to the associated combinations of addresses and port numbers. The TCP SeqNo Offset column may indicate the offset in TCP sequence numbers between the source device and the destination device. The Payload SeqNo Offset column may indicate the offset in payload sequence numbers between the source device and the destination device.

For connection ID 1, there is a TCP SeqNo Offset of 1000 and a Payload SeqNo Offset of 1. This reflects that at least one message between the associated source device and destination device has been discarded, resulting in a total of 1000 bytes of transport-layer payload being lost, as well as one application payload message. Thus, device 100 may adjust future messages transmitted from the source device to the destination device in accordance with this connection ID by decreasing the TCP sequence number by 1000 and decreasing the payload sequence number by 1. FPGA 106 may also adjust future messages transmitted from the destination device to the source device in accordance with this connection ID by increasing the TCP sequence number by 1000 and increasing the payload sequence number by 1.

For connection ID 2, there is a TCP SeqNo Offset of 0 and a Payload SeqNo Offset of 0. This reflects that no messages between the associated source device and destination device have been discarded. Therefore, there would be no adjustment of future messages transmitted between the source device and the destination device in accordance with this connection ID.

For connection ID 3, there is a TCP SeqNo Offset of 5000 and a Payload SeqNo Offset of 4. This reflects that at least one message between the associated source device and destination device has been discarded, resulting in a total of 5000 bytes of transport-layer payload being lost, as well as at least one application payload message. Thus, device 100 may adjust future messages transmitted from the source device to the destination device in accordance with this connection ID by decreasing the TCP sequence number by 5000 and decreasing the payload sequence number by 4. FPGA 106 may also adjust future messages transmitted from the destination device to the source device in accordance with this connection ID by increasing the TCP sequence number by 5000 and increasing the payload sequence number by 4.

Table 2 may be updated each time FPGA 106 discards a message. For instance, if a message with 500 bytes of TCP payload and containing one application message is discarded for connection ID 1, the value of TCP SeqNo Offset for connection ID 1 may be updated to 1500 and the value of Payload SeqNo Offset for connection ID 1 may be updated to 2. Further, Table 2 may be adapted to store more or fewer offset values or to represent these values in different ways. For instance, instead of an offset, the table may store the next valid sequence numbers.

Regardless, at block 428, the message as modified may be transmitted to the destination device. At block 430, post-transmit operations may be carried out, such as updating Table 2, incrementing a count of messages per connection ID, and/or logging the results of the validity checks.

Block 432 involves handling messages that have been (or are going to be) discarded. For instance, block 432 may include operations to update Table 2 or a similar representation of sequence numbers. Other updates to other tables or state representations may be made. If the basis for discarding the message is severe enough, FPGA 106 may force certain TCP connections and/or application layer sessions to close (e.g., by sending frame to the source device with the TCP RST flag set).

Block 434 may involve other processing such as logging the fact that the message was discarded, certain values from the message (e.g., the Ethernet header including the 802.1Q fields), and the reason that the message was discarded.

Notably, in traditional systems, blocks 408, 410, and 412 do not exist because representations of messages in the ultimate payload have not been placed in 802.1Q fields until now. With this improvement, most or all Ethernet frames containing invalid messages do not reach the destination device. This can dramatically reduce the processing load on the destination device, as it does not have to waste resources parsing and discarding (or otherwise handling) invalid messages.

Furthermore, performing these validity checks on a representation of a message in 802.1Q fields results in improvements over doing so only on the corresponding message in the transport-layer payload. The 802.1Q representation and its positioning within the Ethernet header enables the transaction data to be read from bit positions 161 through 224. In contrast, when the message is only represented in the transport-layer payload, it appears much later in the frame and more of the frame must be received and parsed before a decision of whether to discard the frame is made.

As an example, for a 205 byte transport-layer payload, the start and end bit positions that represent the message in the payload can vary, but the start bit position is unlikely to be less than 496 and the end bit position is unlikely to be less than 2135. The time to read the 802.1Q representation at 10 gigabits per second transmission speed is approximately 6.21 nanoseconds, while the time to read the transport-layer payload representation at a 10 gigabits per second transmission speed the time is approximately 158.93 nanoseconds.

Further, when using the 802.1Q representation, the remaining portion of the transmission (with a 205 byte payload) is approximately 2008 bits. When only using the transport-layer payload message, the remaining portion of the transmission is no less than 32 bits. In terms of processing (again at 10 gigabits per second transmission speed), the time to read the remaining portion of the transmission when using the 802.1Q representation is approximately 194.72 nanoseconds. When using only the transport-layer payload message, the processing time is approximately 3.10 nanoseconds. The remaining read time is important because when using only the transport-layer payload message processing, the time from completion of reading the order until the completion of the transmission (3.10 nanoseconds or 1 clock cycle on average) is insufficient to conduct processing of the order to determine whether the order is acceptable. Thus, only the most minimal processing can be conducted without delaying transmission.

Advantageously, the remaining read time when using the 802.1Q representation method (194.72 nanoseconds or 62.8 clock cycles on average) is more than sufficient to conduct a comprehensive review of the order by conducting a variety of checks prior to the conclusion of the transmission. In fact, the time between completing the reading of the order when using the 802.1Q representation compared to starting the reading of the order from the transport-layer payload message (26.47 nanoseconds or 8.5 clock cycles on average) is, in itself, sufficient to complete the processing of almost all checks.

Put another way, when using the 802.1Q representation in a cut-through fashion, the order can be read and the checks processed prior to even starting the reading of the order from the transport-layer payload message. But if only the transport-layer payload message is used, there is almost no time left for reading the order and performing checks on it before the entire frame is received. Thus, under this latter regime, the frame would have to be delayed in order to perform comprehensive checks.

Similar advantages exist when this technique is used with other technologies, such as machine control systems. The embodiments herein can detect problems from sensor readings faster than traditional techniques, and can more quickly shut down systems with anomalous behavior.

B. Example Rules

FIGS. 5, 6A, and 6B contain representations of rules. This is a partial set of example rules directed to performing validity checks on messages containing orders transmitted by a source device to a financial exchange Other rules are possible. Furthermore, this is only one possible example of the types of rules that are supported. Other rule sets, such as those directed to machine control, network firewalls, and/or denial-of-service attack mitigation may be used.

Table 500 of FIG. 5 specifies a number of data sources for rules. The rules are specified in Table 600 of FIGS. 6A and 6B. Each data source has a unique identifier in the ID column of Table 500, which can be referred to in the rules of Table 600.

The location of the data source is specified in the source column of Table 500. A source of M indicates that the data is found in the message (Ethernet frame) being processed. A source of B indicates that the data is found in a memory buffer of FPGA 106.

The name of the data source is specified in the name column of Table 500. Such a name is a convenient way of representing the data source.

A description of the data source is given in the description column of Table 500. Such a description provides a brief overview of the data source and possibly how it can be accessed.

Descriptions of a few examples follow. These examples were selected in a non-limiting fashion to illustrate the operation of the rules. While these examples are focused on the processing of incoming messages, similar processing may occur for outgoing messages.

Data source D001 is from the Ethernet frame being processed, and is the network protocol sequence number. This may be, for instance, a TCP sequence number as discussed above.

Data source D002 is also from the Ethernet frame being processed, and is the network protocol message type. This may be, for example, a TCP segment with the SYN flag set, a TCP segment containing payload data, a TCP segment with the FIN flag set, and so on.

Data source D003 is from a memory buffer that stores the current state of the network protocol. For a TCP-based transaction, this may be the state of the TCP connection, such as open, opening, closed, closing, time-wait, and so on.

Data source D006 is from the Ethernet frame being processed, and is the application protocol sequence number. This may be, for instance, a payload sequence number as discussed above.

Data source D007 is also from the Ethernet frame being processed, and is the application protocol message type. This type may vary based on the application.

Data source D008 is from a memory buffer that stores the current state of the application protocol. This state may also vary based on the application.

Data sources D011-D014 are from the Ethernet frame being processed and represent the side, symbol, price, and quantity. As noted in Table 1, these values may be stored within 802.1Q fields that appear in bits 161-224 of the Ethernet frame.

Table 600 of FIGS. 6A and 6B defines rules that can be applied to information in incoming Ethernet frames and/or stored in memory of FPGA 106. But Table 600 is not a complete set of rules and FPGA 106 can be configured to perform more or fewer rules, and such rules can employ different logic and consider different data sources.

The columns for SE, EB, and PB respectively indicate whether the check is mandated by the sending system, the execution broker, and/or the prime broker. Execution brokers are entities that carry out orders, while prime brokers are entities that coordinate the trading of a vast number of instruments. Orders that arrive at a prime broker may be executed by an execution broker.

As an example, rule 602 involves checking whether the network protocol sequence number in the incoming Ethernet frame is valid. This includes evaluating data source D001 from Table 500. If this sequence number is valid, the Ethernet frame is in compliance with this rule. As noted in the three rightmost columns (and in accordance with the discussion above), if this sequence number is valid it can be re-written based on a sequence number offset table or similar mechanism. Further, the Ethernet frame will not be rejected and no alerts will be generated if the sequence number is re-written.

As a further example, rule 604 involves comparing the network protocol message type indicated by data source D002 to the current state of the network protocol as indicated by data source D003. If execution of this rule indicates that the message type is valid for the state, the Ethernet frame is in compliance with this rule. Otherwise the Ethernet frame is rejected and an alert is generated.

Rules 606 and 608 perform similar functionality as rules 602 and 604, but on the application data in the transport-layer payload.

As yet another example, rule 610 checks that a symbol exists in the message and is valid. This check can be performed on data in the binary representation, for example. If the symbol is not present in the binary representation or is invalid, the message is rejected and an alert is generated.

Complex arithmetical and/or Boolean logic operations can be performed in rules. This is shown in rule 612 of FIG. 6B. This rule multiplies the price indicated in data source D013 by the quantity indicated in data source D014 and checks whether the resulting product exceeds a threshold value. If so, the message is rejected and an alert is generated.

Both data sources can be found in the binary representation (e.g., the non-standard 802.1Q fields of an Ethernet frame).

V. Further Embodiments

Any of the embodiments discussed above may also employ further variations or features that provide additional advantages or improvements. The subsections below provide several such enhancements.

A. Per-Entity Validity Checks

As discussed in the context of FIG. 1G, parsing and validation module 116 may have the capability to perform a number of validity checks on a message or its binary representation in parallel. A more specific version of FIG. 1G is provided as FIG. 7. In the latter, parsing and validation module 116 has four parallel paths, each performing a different set of validation checks. A copy of the message or its binary representation are provided to each of the paths.

These examples assume an environment in which FPGA 106 is being used to validate orders of securities as described above. Thus, the sender of the message is assumed to be the entity controlling the physical device in which the orders are generated (e.g., a server device containing FPGA 106). A separate execution broker may carry out these orders, while a distinct prime broker may coordinate the execution of orders across one or more execution brokers. In some cases, a single entity may operate as both an execution broker and a prime broker.

General validation checks 700A may include message integrity checks (e.g., is the message or binary representation thereof formatted properly) as well as any application-specific checks (e.g., does the message or binary representation contain a valid order). In some cases, these message integrity checks and application-specific checks may be performed in parallel to one another. Therefore, general validation checks 700A may represent one or more sets of parallel checks.

Sender validation checks 700B are checks that the sender wishes to or is required to perform on all messages. These checks may be performed regardless of execution broker or prime broker. Alternatively, these checks may depend on the execution broker or prime broker. Thus, in some cases, the sender may perform different checks for different execution brokers and/or prime brokers. Alternatively or additionally, different values could be used for the same checking logic for different brokers.

Execution broker (EB) validation checks 700C are checks that the execution broker wishes to or is required to perform on all orders that the execution broker executes. Thus, different execution brokers could perform different checks on messages and/or use different values for these checks. As an example, one execution broker may have one single order value limit while another execution broker could use a different single order value limit. Put another way, different execution brokers may conduct checks based on different rules of Table 600, and may use different values (e.g., thresholds) for these rules. Thus, execution broker validation checks 700C may represent numerous sets of logic, one for each execution broker.

Prime broker (PB) validation checks 700D are checks that the prime broker wishes to or is required to perform on all orders that the prime broker handles. Thus, different prime brokers could perform different checks on messages and/or use different values for these checks. As an example, a prime broker may have one total monetary limit for trades performed by execution broker A and a different total monetary limit for trades performed by execution broker B. Thus, prime broker validation checks 700D may also represent numerous sets of logic, one for each prime broker.

Sender validation checks 700B, execution broker validation checks 700C, and prime broker validation checks 700D may be mixed and matched in various combinations. For example, the sender may apply a consistent set of validation checks for all orders, while the prime broker may apply different checks for each execution broker as noted above. Thus, the logic in prime broker validation checks 700D may take the identity of the execution broker into account and adjust its operations accordingly.

Further, each set of checks may be entirely under the control of its corresponding entity. Thus, sender validation checks 700B can only be modified by the sender, execution broker validation checks 700C can only be modified by the corresponding execution broker, and prime broker validation checks 700D can only be modified by the corresponding prime broker. This policy can be cryptographically enforced, as discussed below.

As noted above, whether the message is transmitted or discarded is based on whether all appropriate checks pass. Thus, if general validation checks 700A, sender validation checks 700B, execution broker validation checks 700C, and prime broker validation checks 700D all pass, the message would be transmitted. If any one or more of these checks fail, the message would be discarded.

B. Message Queuing

Another embodiment involves variations on message queuing. Considering device 100 as shown in FIG. 1A, outgoing messages are encapsulated by network protocol stack 114 and then transmitted by the MAC module. Conventionally, these messages are queued for transmission and transmitted in a first-in-first-out (FIFO) fashion. But there may be applications in which it is advantageous to queue and transmit messages in other ways.

Considering again the environment in which FPGA 106 is being used to validate orders of securities as described above, traditional mechanisms involve market data (e.g., offer prices for securities) being received by FPGA 106 or another set or interfaces and/or another protocol stack, this market data being passed over a bus such as PCIe bus 104, and processed by application programs on device 100. All of this reception and processing takes time, and once an order is formed in response to the market data, that data may be out of date.

In a concrete example, suppose that market data arrives at a device indicating that a security is being offered at a price of $105 on a particular exchange. This market data is processed by the interface, network protocol stack, bus, and application program of the device, the application program determining to make a bid for aggressively purchasing a block of the security at $105 (i.e., a scenarios in which the buyer crosses the spread). Therefore, the application program generates a message containing the order, which then propagates across the bus, through the next protocol stack, and is transmitted to the exchange.

But due to the aforementioned latency, the price may have increased to $106 by the time that the order is transmitted. Thus, instead of potentially transmitting the best offer for the security with a spread of $0, this offer might be no better or worse than numerous other bids with a spread of $1.

Instead of this technique, it is desirable to be able to generate an order for a block of securities at a particular price without knowing whether that order is marketable. For instance, the order can be generated before the market opens, or at any time when the market is open. Associated with the order is a set of conditions that, when satisfied, result in the order being sent to the exchange. These conditions may be based on offer price of the security, available quantities of the security, and so on.

Continuing with the example above, if the order is for a block of the securities at $105, this order may be held until the market data indicates that the order is marketable. Then the order is transmitted.

Figure 8A:
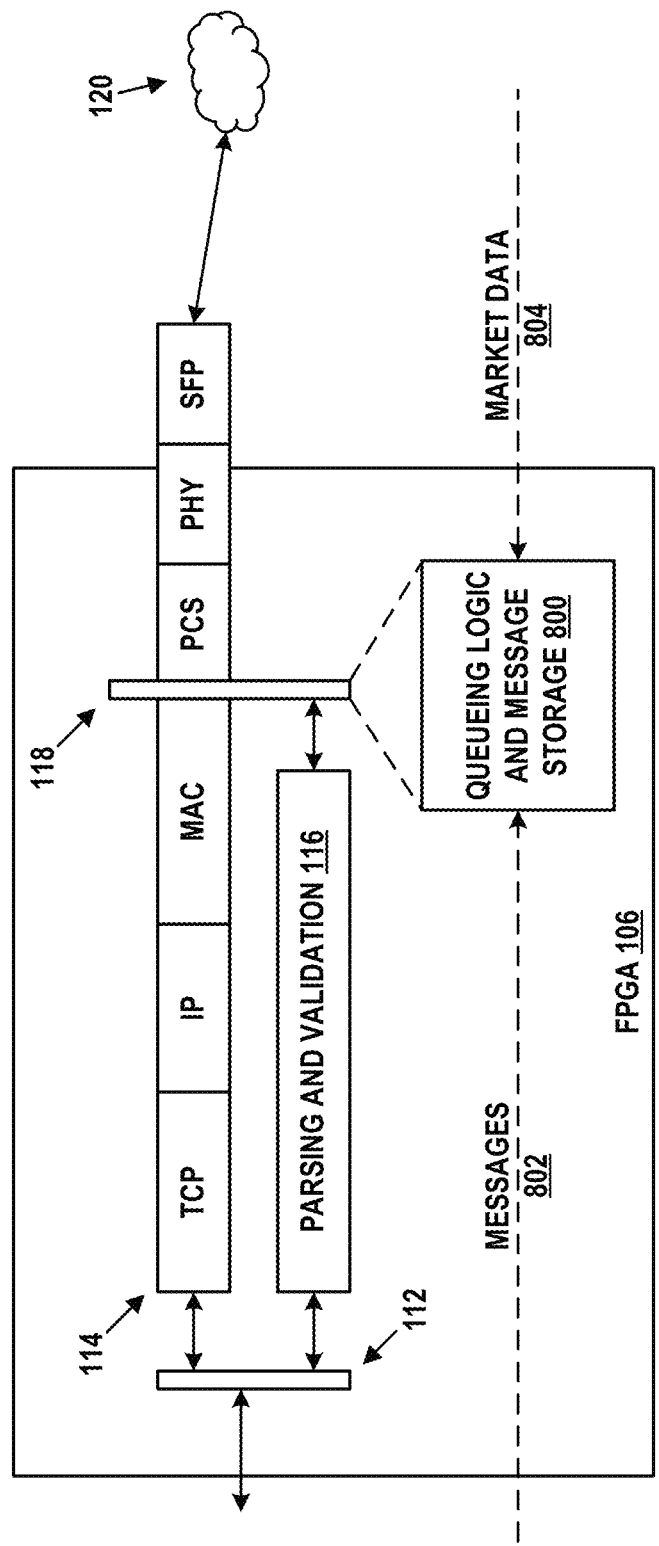
FIG. 8A illustrates the processing hardware supporting queuing logic and message storage, in accordance with example embodiments.

Such functionality can be placed in FPGA 106 to improve performance. FIG. 8A depicts FPGA 106 from FIG. 1A, but with control module 118 expanded to include queuing logic and message storage 800. Notably, queuing logic and message storage 800 may be placed in various positions in network protocol stack 114, including within the MAC module.

Queuing logic and message storage 800 contains storage for messages 802 that are received by FPGA 106. These messages may be received from messaging unit 102 or some other entity. Those of messages 802 that are received from messaging unit 102 are processed by network protocol stack 114 and parsing and validation module 116 as described above. For purposes of simplicity, a dashed line is used in FIG. 8A to represent the path of these messages.

Messages 802 may be associated with an indicator that they are to be queued rather than immediately transmitted to an exchange on network 120, and may include a representation of the conditions upon which they are to be released. As shown, messages 802 may have traversed at least part of network protocol stack 114, and therefore may already be encapsulated in at least parts of a TCP header, an IP header, and a MAC header. In other words, messages 802 are ready or almost ready for transmission. Queuing logic and message storage 800 also receives market data in real time or near real time from the exchange.

Upon arriving at control module 118, the queuing logic checks the conditions associated with such a message. If the conditions are satisfied, the message is transmitted immediately and is not queued. This immediate transmission may take a small number of clock cycles (e.g., 1-2) in practice. Otherwise, the message is queued along with its conditions.

As market data 804 arrives at FPGA 106, queuing logic and message storage 800 checks this data against the conditions associated with queued messages. Though it is not shown in FIG. 8A, market data 804 may traverse network protocol stack 114 before being processed by queuing logic and message storage 800. If the conditions of a message are satisfied, the message is then transmitted immediately. Again, this rapid transmission may take a small number of clock cycles (e.g., 1-2) in practice.

In this fashion, an order can be generated and later transmitted upon determining that market conditions are favorable. Queuing the message in FPGA 106 in a ready-to-transmit form results the transmission of the message being much faster than generating the message in an application program, transmitting it across PCIe bus 104, through network protocol stack 114, and out to network 120. Thus, the embodiments herein reduce the latency of engaging in these (and potentially other) types of transactions.

Figure 8B:
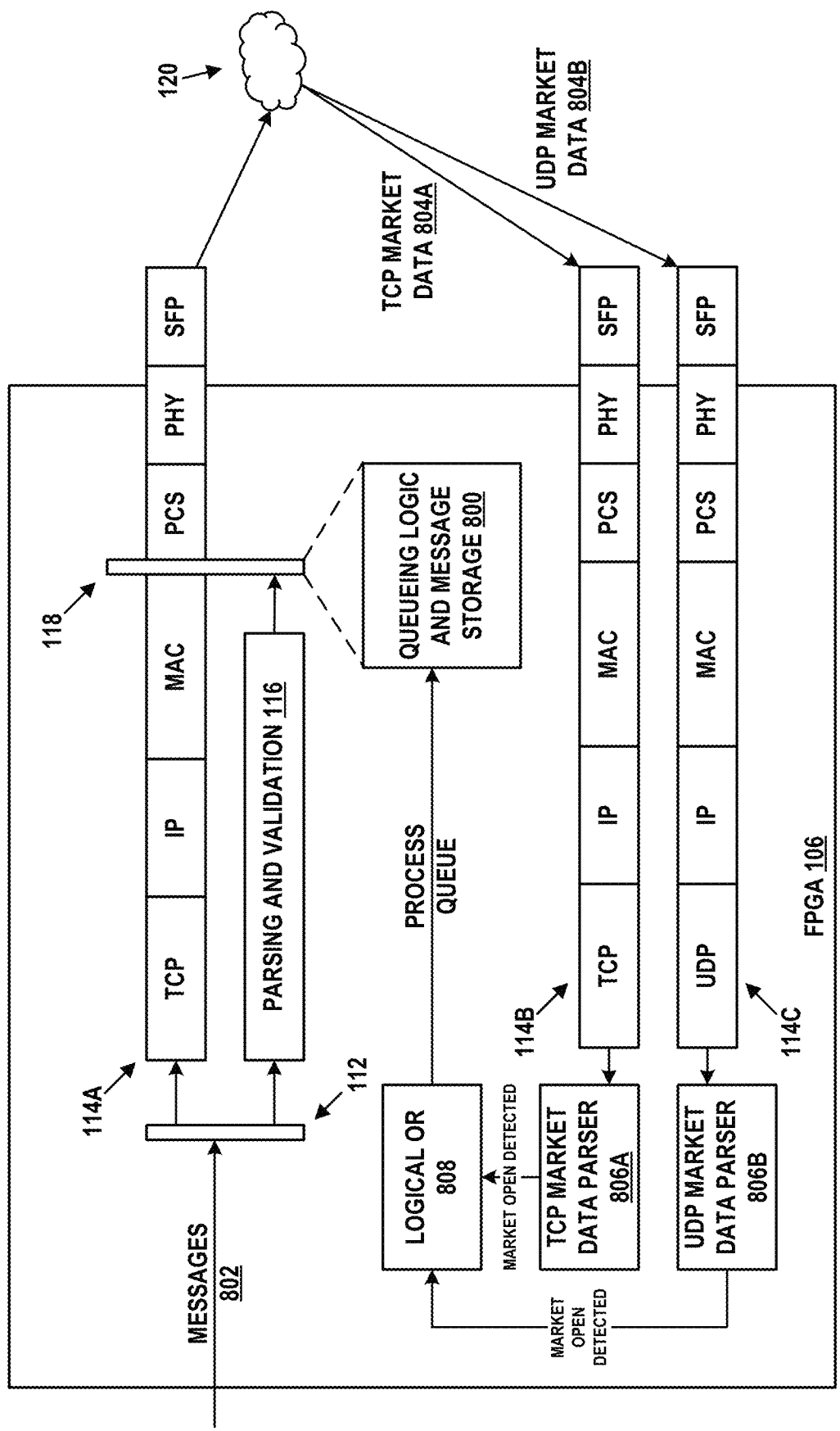
FIG. 8B illustrates the processing hardware receiving messages and data by way of different network interfaces, in accordance with example embodiments.

FIG. 8B illustrates this arrangement in more detail. Notably, messages 802, TCP market data 804A and UDP market data 804B are routed to and processed by three different network protocol stacks 114A, 114B, and 114C, respectively. In various embodiments, however more or fewer network protocol stacks may be used.

Messages 802 are processed in accordance with the discussion of FIG. 8A. Thus, messages 802 are received, processed by network protocol stack 114A and parsing and validation module 116, and then some may be processed by and/or held in queuing logic and message storage 800. Messages 802 may contain security orders.

TCP market data 804A may be received from network 120 and processed by network protocol stack 114B. TCP market data 804A may be originated by an exchange in TCP packets. TCP market data parser 806A receives the payload of TCP market data 804A after decapsulation by network protocol stack 114B, and then reads and parses this data in real time or near real time. While network protocol stack 114B validates that the frames containing TCP market data 804A have not been corrupted, TCP market data parser 806A verifies the validity of the structure of TCP market data 804A, according to exchange specifications. When the structure of TCP market data 804A has been recognized by the parser and the market open signal has been detected (in TCP market data 804A or from another source), TCP market data parser 806A sends a "market open detected" signal to logical OR 808.

UDP market data 804B may be received from network 120 and processed by network protocol stack 114C. UDP market data 804B may be originated by an exchange in UDP packets. UDP market data parser 806B receives UDP market data 804B after decapsulation by network protocol stack 114C, and then reads and parses this data in real time or near real time. While network protocol stack 114C validates that the frames containing UDP market data 804B have not been corrupted, UDP market data parser 806B verifies the validity of the structure of UDP market data 804B, according to exchange specifications. When the structure of UDP market data 804B has been recognized by the parser and the market open signal has been detected (in UDP market data 804B or from another source), UDP market data parser 806B sends a "market open detected" signal to logical OR 808.

Logical OR 808 performs a logical OR operation on binary signals from TCP market data parser 806A and UDP market data parser 806B. If either of these signals indicates that the market is open, logical OR 808 transmits a process queue signal to queuing logic and message storage 800. This may trigger queuing logic and message storage 800 to evaluate any queued messages to determine whether these messages are ready for transmission. Queuing logic and message storage 800 may then transmit ready messages.

Incoming messages from network 120 (e.g., from an exchange) may carry a payload that contains a header and data. Both TCP market data parser 806A and UDP market data parser 806B may parse these payloads as follows.

From the header, the parser extracts the type of message, message size, sequence number (if applicable), market information, and client information. Depending on the type of message, the parser validates that the message is of the indicated size. If this size is not according to the specifications of the exchange, the message will be discarded. If needed, the parser may also check the sequence number of the message and the client information to make sure that the right message has been received. For the data part of the message, the parser may validate the structure of the message depending on its type as indicated by the header. While doing so, the parser may identify elements of the message by applying a pre-defined mask on the data, based on the exchange specification.

This is illustrated in FIG. 8C. A message contains header 810 and data 816. The type and size of the message are obtained from header 810 and at least the type is validated at block 812. At block 814 a mask is applied to data 816 in order to identify the value of a market start indicator. If the market start indicator specifies that the market is open, the parser may transmit a market open detected signal to logical OR 808 (as shown in FIG. 8B).

FIG. 8D depicts processing of an outgoing message, e.g., generated by messaging unit 102. The message contains header 820 and data 822. The type and size of the message are obtained from header 820 and at least the type is used at block 824 to determine whether data 822 contains an order. If this is the case, at least part of header 820 and/or data 822 is provided to queuing logic and message storage 800. Otherwise (e.g., if the message is administrative or related to a connection with the exchange), queuing logic and message storage 800 is bypassed.

C. Encryption of FPGA Application and Data

Certain FPGA chips have on-chip advanced encryption standard (AES) or similar symmetric key decryption logic to provide design security. Encrypted designs cannot be copied, tampered with or reverse engineered. The compiled binary application that carries out the functions specified herein is encrypted. The symmetric key used for this encryption is generated by the vendor and permanently stored in dedicated eFUSE non-volatile memory on the FPGA. Other types of one-time programmable (OTP) memory may be used. The compiled binary application is presented to the FPGA chip as a bitstream and FPGA chip decrypts the incoming bitstream, using this key, during configuration.

The FPGA may have one or more eFUSE non-volatile registers. The eFUSEs, once burned/blown by flowing a large current for a specific amount of time, can neither be modified, accessed, nor erased for the chip's lifetime. Since they are fuses, they are insensitive to power losses of any kind. Thus, they are physically and permanently set and no entity will be able to read, update, or erase the key. As a result, the key becomes a part of the chip for its lifetime.

Therefore, the only two states the FPGA chip can have are either (1) programmed with vendor-certified encrypted logic, or (2) not programmed at all, i.e., an empty FPGA chip which is unusable. As long as the key is kept secret by the vendor, the eFUSE feature gives exclusive control of the creation, modification, and management of the FPGA logic to the key's owner wherever the FPGA is located, and whether the FPGA is powered on or off.

VI. Example Operations

Figure 9A:
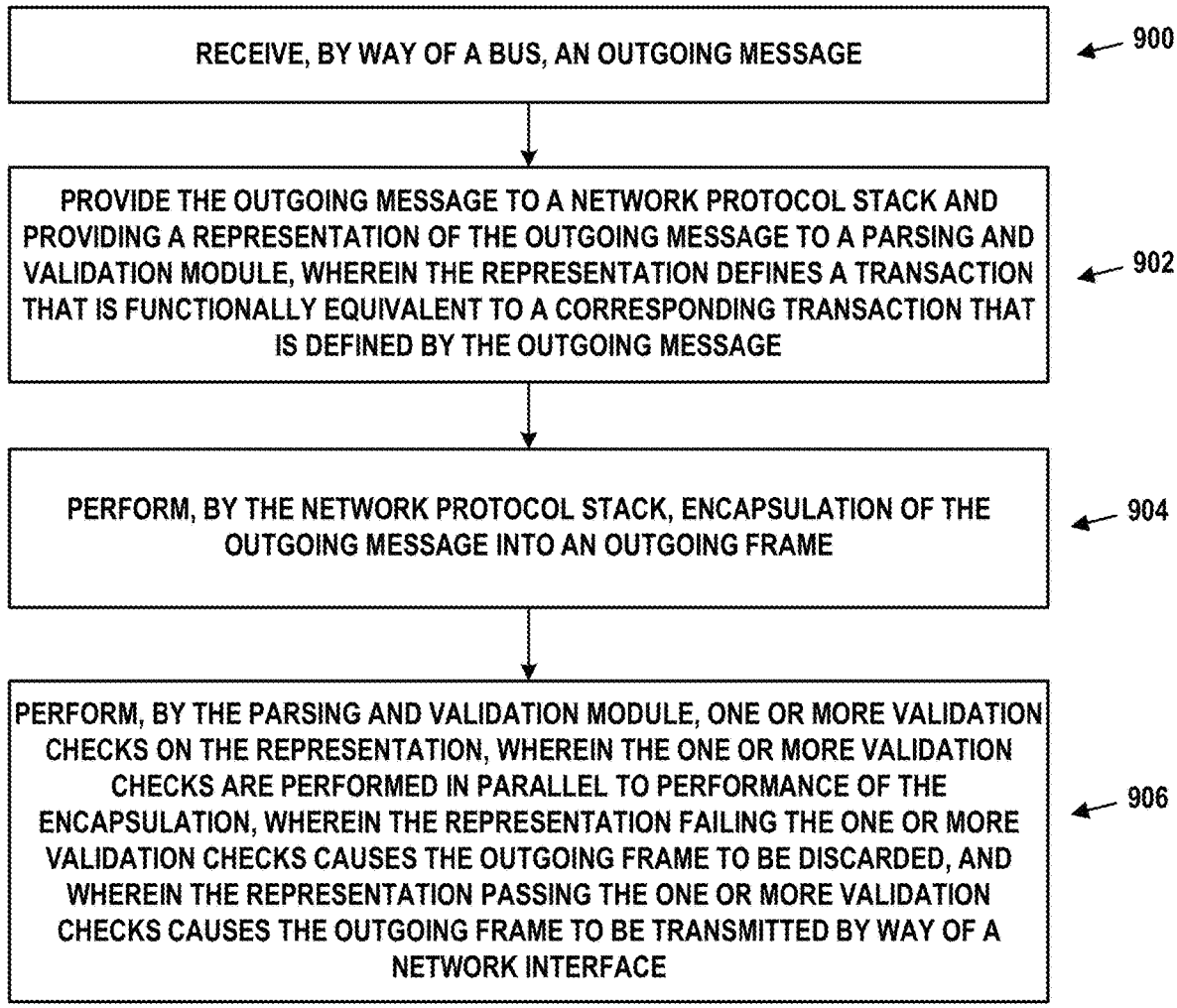
FIGS. 9A and 9B are flow charts, in accordance with example embodiments.
Figure 9B:
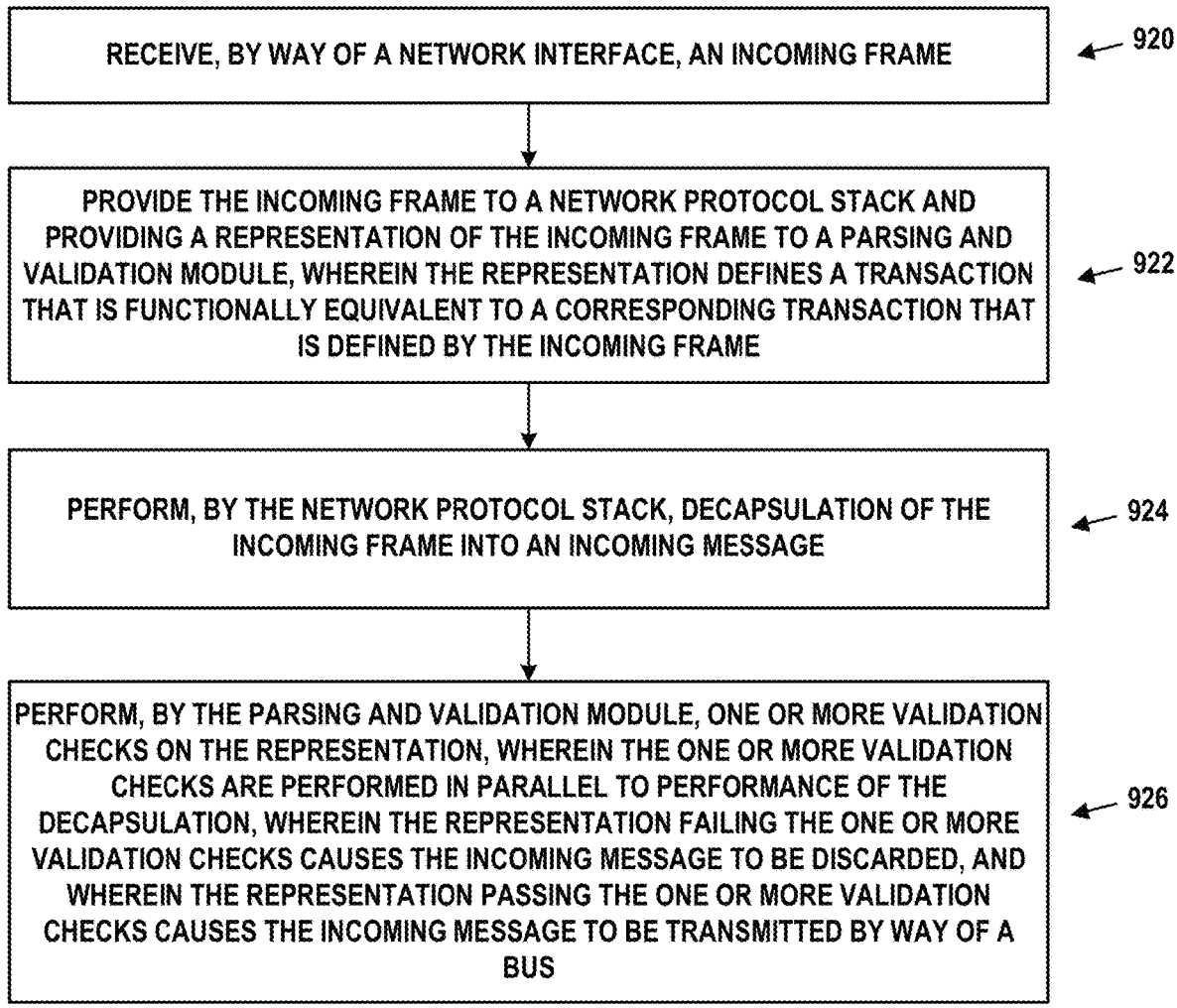

FIGS. 9A and 9B depict flow charts illustrating example embodiments. The processes illustrated by FIGS. 9A and 9B may be carried out by an integrated circuit, FPGA 106, or device 100 as described herein. However, the processes can be carried out by other types of devices or device subsystems. The embodiments of FIGS. 9A and 9B may be simplified by the removal of any one or more of the features shown therein. Further, these embodiments may be combined with features, aspects, and/or implementations of any of the previous figures or otherwise described herein.

Block 900 of FIG. 9A may involve receiving, by way of a bus, an outgoing message.

Block 902 may involve providing the outgoing message to a network protocol stack and providing a representation of the outgoing message to a parsing and validation module, wherein the representation defines a transaction that is functionally equivalent to a corresponding transaction that is defined by the outgoing message.

Here, a "functionally equivalent" representation of the corresponding transaction is one that represents all of, or at least part of, the corresponding transaction. Thus, the data may define the transaction to contain less information than the corresponding transaction that appears in the outgoing message. But the information that is in the data is sufficient to determine whether the outgoing message should be discarded.

Block 904 may involve performing, by the network protocol stack, encapsulation of the outgoing message into an outgoing frame.

Block 906 may involve performing, by the parsing and validation module, one or more validation checks on the representation, wherein the one or more validation checks are performed in parallel to performance of the encapsulation, wherein the representation failing the one or more validation checks causes the outgoing frame to be discarded, and wherein the representation passing the one or more validation checks causes the outgoing frame to be transmitted by way of a network interface.

In some embodiments, the one or more validation checks include a first set of validation checks from a first entity, a second set of validation checks from a second entity, and a third set of validation checks from a third entity, wherein the one or more validation checks pass only if the first set of validation checks, the second set of validation checks, and the third set of validation checks pass. In some embodiments, the first set of validation checks, the second set of validation checks, and the third set of validation checks each involves applying different rules or different threshold values.

Some embodiments may further involve queuing, in message storage, the outgoing frame based on pre-determined conditions; receiving triggering data; determining that the triggering data satisfies the pre-determined conditions; and in response to determining that the triggering data satisfies the pre-determined conditions, releasing the outgoing frame.

Some embodiments may involve a control module configured to provide the outgoing message to the network protocol stack, and to provide the representation to the parsing and validation module.

In some embodiments, the network interface is one of a plurality of network interfaces, or the network protocol stack is one of a plurality of network protocol stacks.

In some embodiments, the outgoing messages are received by way of a bus, wherein the bus is communicatively coupled to an application program that provides the outgoing messages.

FIG. 9B involves operations that may be carried out independently of or in conjunction with the operations of FIG. 9A. Block 920 of FIG. 9B may involve receiving, by way of a network interface, an incoming frame.

Block 922 may involve providing the incoming frame to a network protocol stack and providing a representation of the incoming frame to a parsing and validation module, wherein the representation defines a transaction that is functionally equivalent to a corresponding transaction that is defined by the incoming frame.

Here, a "functionally equivalent" representation of the corresponding transaction is one that represents all of, or at least part of, the corresponding transaction. Thus, the data may define the transaction to contain less information than the corresponding transaction that appears in the incoming frame. But the information that is in the data is sufficient to determine whether the incoming frame should be discarded.

Block 924 may involve performing, by the network protocol stack, decapsulation of the incoming frame into an incoming message.

Block 926 may involve performing, by the parsing and validation module, one or more validation checks on the representation, wherein the one or more validation checks are performed in parallel to performance of the decapsulation, wherein the representation failing the one or more validation checks causes the incoming message to be discarded, and wherein the representation passing the one or more validation checks causes the incoming message to be transmitted by way of a bus.

In some embodiments, the one or more validation checks include a first set of validation checks from a first entity, a second set of validation checks from a second entity, and a third set of validation checks from a third entity, wherein the one or more validation checks pass only if the first set of validation checks, the second set of validation checks, and the third set of validation checks pass. In some embodiments, the first set of validation checks, the second set of validation checks, and the third set of validation checks each involves applying different rules or different threshold values.

In some embodiments, the representation is encoded in one or more 802.1Q fields of the incoming frame, and wherein the one or more 802.1Q fields are formatted in a non-standard fashion.

Some embodiments may involve a control module configured to provide: (i) the incoming frames to the network protocol stack, and (ii) the representations to the parsing and validation module.

In some embodiments, the network interface is one of a plurality of network interfaces, or the network protocol stack is one of a plurality of network protocol stacks.

In some embodiments, the incoming messages are transmitted by way of a bus, wherein the bus communicatively couples the integrated circuit to an application program that receives the incoming messages.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. An integrated circuit comprising:
a network interface configured to transmit frames on a network;
a network protocol stack configured to: perform encapsulation of outgoing messages into outgoing frames;
a parsing and validation module configured to: receive outgoing representations of the outgoing messages, and perform one or more validation checks on the outgoing representations, wherein the outgoing representations define transactions that are functionally equivalent to corresponding transactions that are defined by payload content within the outgoing messages, wherein an outgoing representation of an outgoing message passing the one or more validation checks causes a corresponding outgoing frame to be provided to the network interface for transmission on the network, and wherein the outgoing representation of the outgoing message failing the one or more validation checks causes the corresponding outgoing frame to not be provided to the network interface for transmission on the network; and a control module configured to provide the outgoing messages to the network protocol stack and the outgoing representations to the parsing and validation module, wherein the one or more validation checks are performed in parallel to performance of the encapsulation.

2. The integrated circuit of claim 1, wherein the network interface is also configured to receive frames from the network, and wherein the network protocol stack is also configured to perform decapsulation of incoming frames received by way of the network interface into incoming messages.

3. The integrated circuit of claim 2, wherein the parsing and validation module is further configured to receive incoming representations of the incoming messages, and perform the one or more validation checks on the incoming representations, wherein the incoming representations define transactions that are functionally equivalent to corresponding transactions that are defined by payload content within the incoming messages, wherein the one or more validation checks are performed in parallel to performance of the decapsulation.

4. The integrated circuit of claim 3, further comprising:

a further control module configured to provide: the incoming frames to the network protocol stack, and the incoming representations to the parsing and validation module.

5. The integrated circuit of claim 4, wherein the outgoing representations or incoming representations are encoded in one or more 802.1Q fields of incoming frames or outgoing frames, respectively.

6. The integrated circuit of claim 5, wherein the one or more 802.1Q fields are formatted in a non-standard fashion.

7. The integrated circuit of claim 1, wherein the one or more validation checks include a first set of validation checks from a first entity, a second set of validation checks from a second entity, and a third set of validation checks from a third entity, and wherein the one or more validation checks pass only if the first set of validation checks, the second set of validation checks, and the third set of validation checks pass.

8. The integrated circuit of claim 7, wherein the first set of validation checks, the second set of validation checks, and the third set of validation checks each involves applying different rules or different threshold values.

9. The integrated circuit of claim 1, further comprising:

queuing logic configured to queue and release a subset of the outgoing frames based on pre-determined conditions; and message storage configured to store queued frames.

10. The integrated circuit of claim 9, wherein the subset of the outgoing frames are associated with information indicating that they are to be queued, and wherein the queuing logic queues the subset of the outgoing frames based on the information indicating that they are to be queued.

11. The integrated circuit of claim 9, wherein the queuing logic is also configured to: (i) receive triggering data by way of the network interface, (ii) compare the triggering data to the pre-determined conditions, and (iii) release any queued frames associated with pre-determined conditions that are satisfied by the triggering data, wherein releasing the queued frames causes the queued frames to be transmitted by way of the network interface.

12. The integrated circuit of claim 1, further comprising:

one-time programmable memory configured to store a symmetric encryption key, wherein operations performed by the integrated circuit are defined in program logic encrypted by the symmetric encryption key.

13. The integrated circuit of claim 1, wherein the outgoing messages are received by way of a bus, wherein the bus communicatively couples the integrated circuit to an application program that provides the outgoing messages.

14. The integrated circuit of claim 2, wherein the incoming messages are transmitted by way of a bus, wherein the bus communicatively couples the integrated circuit to an application program that receives the incoming messages.

15. A method performed by an integrated circuit, the method comprising:

receiving, by way of a bus, an outgoing message;

providing the outgoing message to a network protocol stack and providing a representation of the outgoing message to a parsing and validation module, wherein the representation defines a transaction that is functionally equivalent to a corresponding transaction that is defined by payload content within the outgoing message;

performing, by the network protocol stack, encapsulation of the outgoing message into an outgoing frame; and performing, by the parsing and validation module, one or more validation checks on the representation, wherein the one or more validation checks are performed in parallel to performance of the encapsulation, wherein the representation failing the one or more validation checks causes the outgoing frame to be discarded, and wherein the representation passing the one or more validation checks causes the outgoing frame to be transmitted by way of a network interface.

16. The method of claim 15, wherein the one or more validation checks include a first set of validation checks from a first entity, a second set of validation checks from a second entity, and a third set of validation checks from a third entity, and wherein the one or more validation checks pass only if the first set of validation checks, the second set of validation checks, and the third set of validation checks pass.

17. The method of claim 15, further comprising:

queuing, in message storage, the outgoing frame based on pre-determined conditions;

receiving triggering data;

determining that the triggering data satisfies the pre-determined conditions; and in response to determining that the triggering data satisfies the pre-determined conditions, releasing the outgoing frame.

18. A method performed by an integrated circuit, the method comprising:

receiving, by way of a network interface, an incoming frame;

providing the incoming frame to a network protocol stack and providing a representation of the incoming frame to a parsing and validation module, wherein the representation defines a transaction that is functionally equivalent to a corresponding transaction that is defined by payload content within the incoming frame;

performing, by the network protocol stack, decapsulation of the incoming frame into an incoming message; and performing, by the parsing and validation module, one or more validation checks on the representation, wherein the one or more validation checks are performed in parallel to performance of the decapsulation, wherein the representation failing the one or more validation checks causes the incoming message to be discarded, and wherein the representation passing the one or more validation checks causes the incoming message to be transmitted by way of a bus.

19. The method of claim 18, wherein the one or more validation checks include a first set of validation checks from a first entity, a second set of validation checks from a second entity, and a third set of validation checks from a third entity, and wherein the one or more validation checks pass only if the first set of validation checks, the second set of validation checks, and the third set of validation checks pass.

20. The method of claim 18, wherein the representation is encoded in one or more 802.1Q fields of the incoming frame, and wherein the one or more 802.1Q fields are formatted in a non-standard fashion.

\* \* \* \* \*